United States Patent
Noh et al.

(10) Patent No.: US 10,498,424 B2
(45) Date of Patent: Dec. 3, 2019

(54) METHOD AND APPARATUS FOR REFERENCE SIGNAL CONFIGURATIONS FOR CSI-RS PORT SHARING IN MOBILE COMMUNICATION SYSTEM USING MASSIVE ARRAY ANTENNAS

(71) Applicant: Samsung Electronics Co., Ltd., Suwon-si, Gyeonggi-do (KR)

(72) Inventors: Hoondong Noh, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/206,378

(22) Filed: Nov. 30, 2018

(65) Prior Publication Data
US 2019/0097708 A1    Mar. 28, 2019

Related U.S. Application Data

(63) Continuation of application No. 15/664,641, filed on Jul. 31, 2017, now Pat. No. 10,148,334.

(30) Foreign Application Priority Data

Jul. 29, 2016    (KR) .................... 10-2016-0097558

(51) Int. Cl.
*H04L 1/02* (2006.01)
*H04B 7/06* (2006.01)
(Continued)

(52) U.S. Cl.
CPC .......... *H04B 7/0626* (2013.01); *H04B 7/0417* (2013.01); *H04B 7/0628* (2013.01);
(Continued)

(58) Field of Classification Search
CPC ....... H04L 1/0618; H04L 1/06; H04L 5/0048; H04L 5/005; H04L 5/0057; H04B 7/0417; H04B 7/0639; H04W 24/10
(Continued)

(56) References Cited

U.S. PATENT DOCUMENTS 10,148,334 B2 * 12/2018 Noh ................. H04B 7/0626
2015/0124753 A1    5/2015 Kim et al.
(Continued)

FOREIGN PATENT DOCUMENTS

WO    2016-159621 A1    10/2016

OTHER PUBLICATIONS

CATT: "Remaining details of CSI-RS for class A", 3GPP Draft; R1-157447, XP051040122, Nov. 15, 2015.

*Primary Examiner* — Khai Tran
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) are provided. The present disclosure may be applied to intelligent services based on the 5G communication technology and the IoT-related technology, such as smart home, smart building, smart city, smart car, connected car, health care, digital education, smart retail, security and safety services. According to embodiments of the present disclosure, The system includes a base station having a large number of transmission antennas of a two dimensional (2D) antenna array structure can prevent excessive feedback resource allocation for transmitting channel state information reference signals (CSI-RSs) and increase of channel estimation complexity of a terminal, and the terminal can effectively measure channels of a large number of transmission antennas and can (Continued)

report to the base station feedback information configured through the measurement.

20 Claims, 25 Drawing Sheets

(51) Int. Cl.
*H04B 7/0417* (2017.01)
*H04L 5/00* (2006.01)

(52) U.S. Cl.
CPC ......... *H04B 7/0632* (2013.01); *H04L 5/0023* (2013.01); *H04L 5/0035* (2013.01); *H04L 5/0048* (2013.01)

(58) Field of Classification Search
USPC ........ 375/267, 260, 295; 370/252, 280, 320, 370/329
See application file for complete search history.

(56) References Cited

U.S. PATENT DOCUMENTS

| | | |
|---|---|---|
| 2015/0288497 A1 | 10/2015 | Li et al. |
| 2015/0341093 A1 | 11/2015 | Ji et al. |
| 2016/0211902 A1 | 7/2016 | Park et al. |
| 2016/0315721 A1 | 10/2016 | Lee et al. |
| 2018/0219603 A1* | 8/2018 | Park .......................... H04B 7/06 |
| 2018/0351621 A1* | 12/2018 | Wei ..................... H04B 7/0478 |

* cited by examiner

Frequency domain CSI-RS decomposition

FIG. 5A
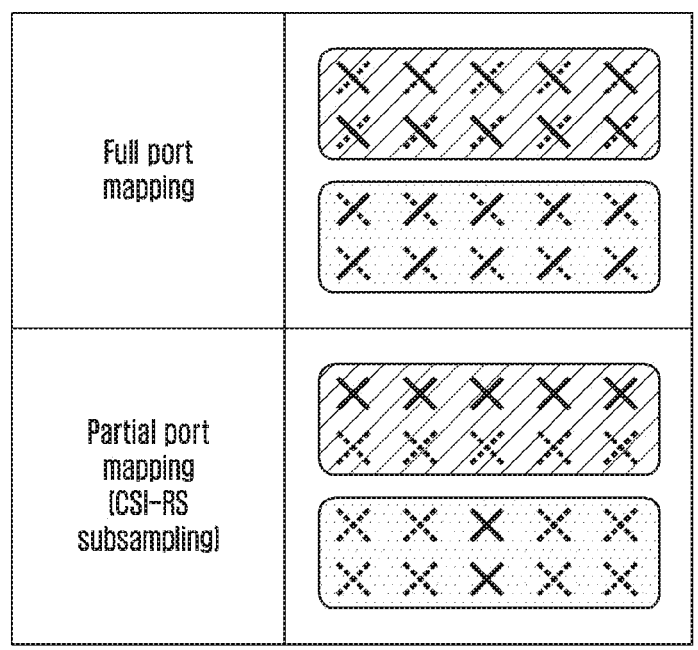
 : CSI-RS ports in the first OFDN symbol/ subframe/PRB ~500
 : CSI-RS ports in the second OFDN symbol/ subframe/PRB ~510

FIG. 5B
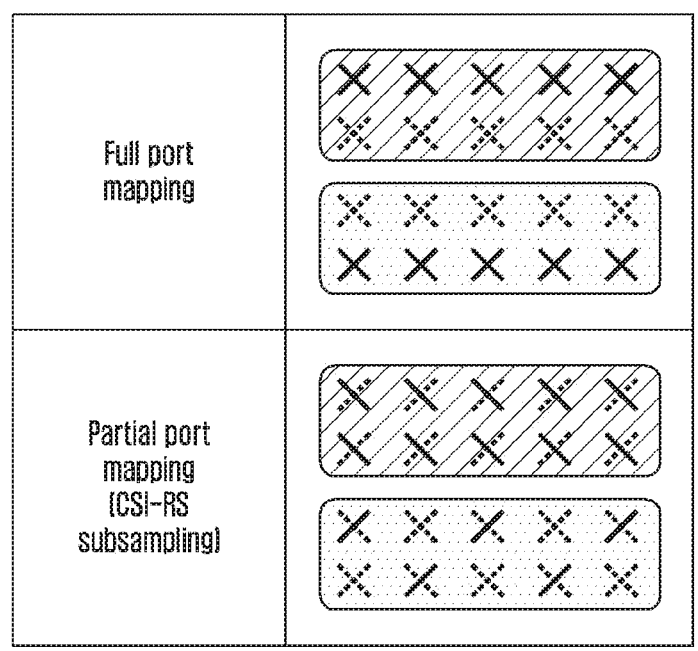
: CSI-RS ports in the first OFDN symbol/ subframe/PRB ~500
: CSI-RS ports in the second OFDN symbol/ subframe/PRB ~510

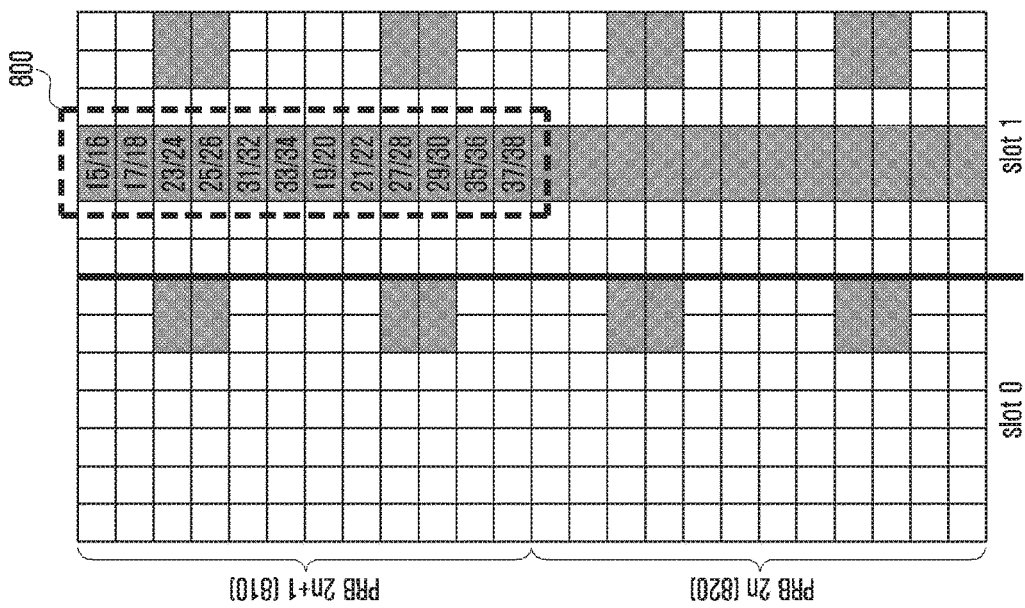
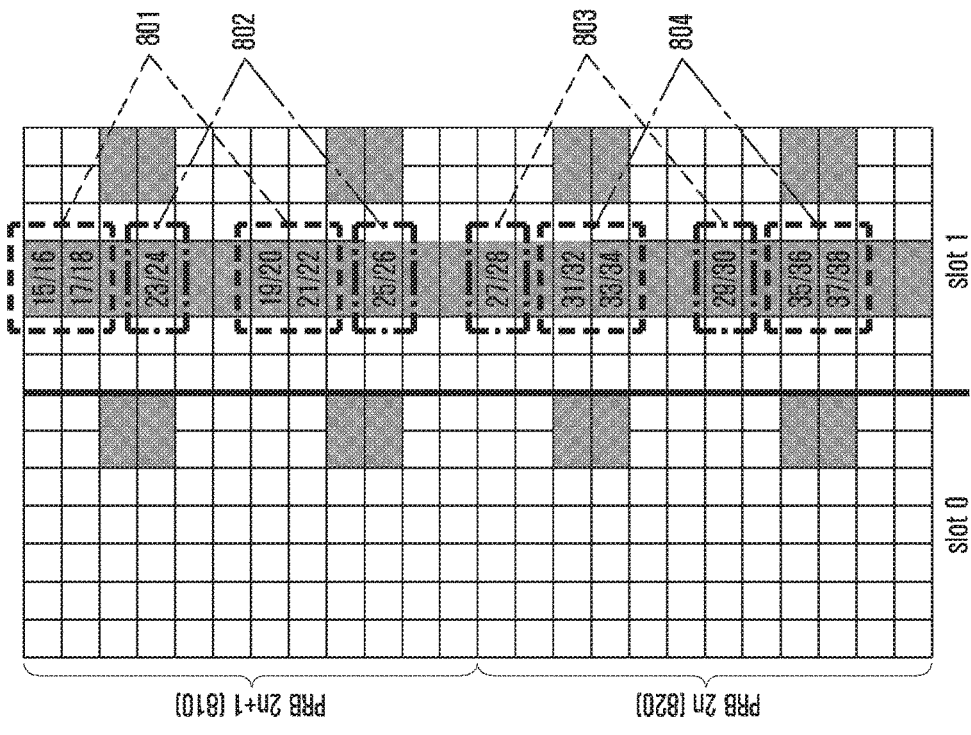
FIG. 8

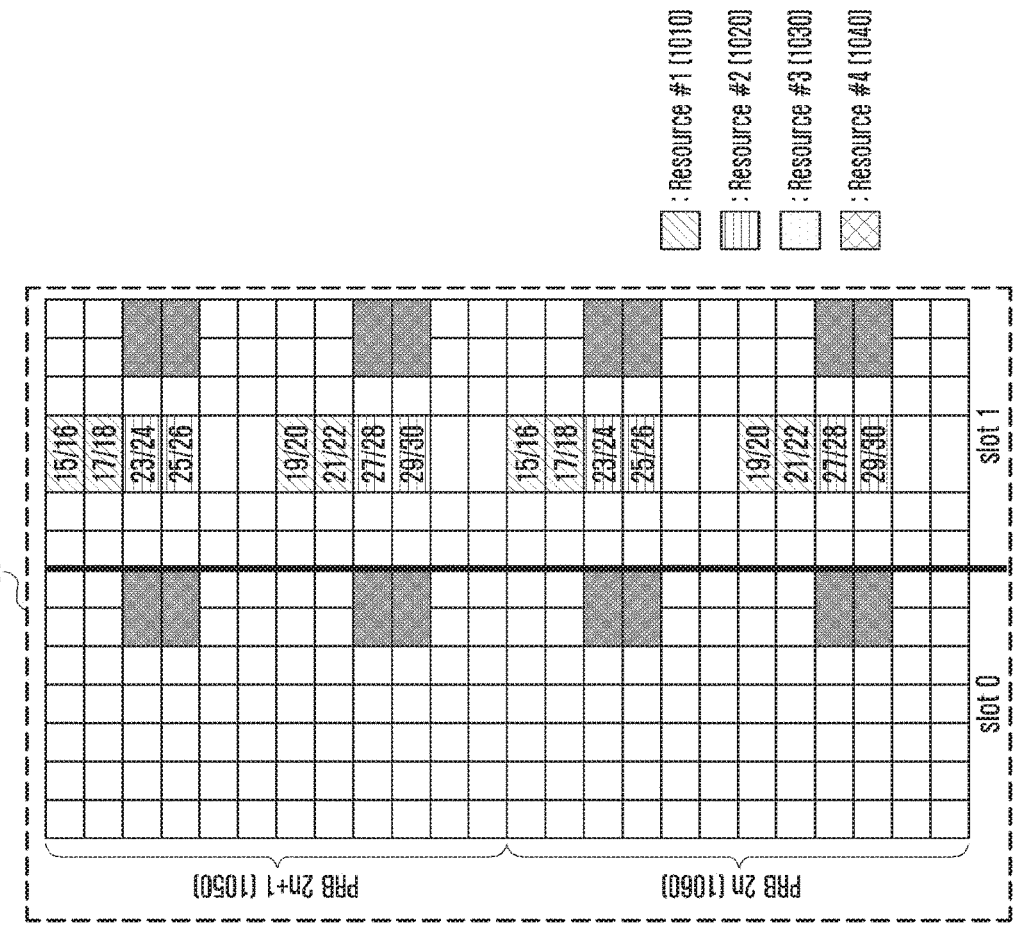
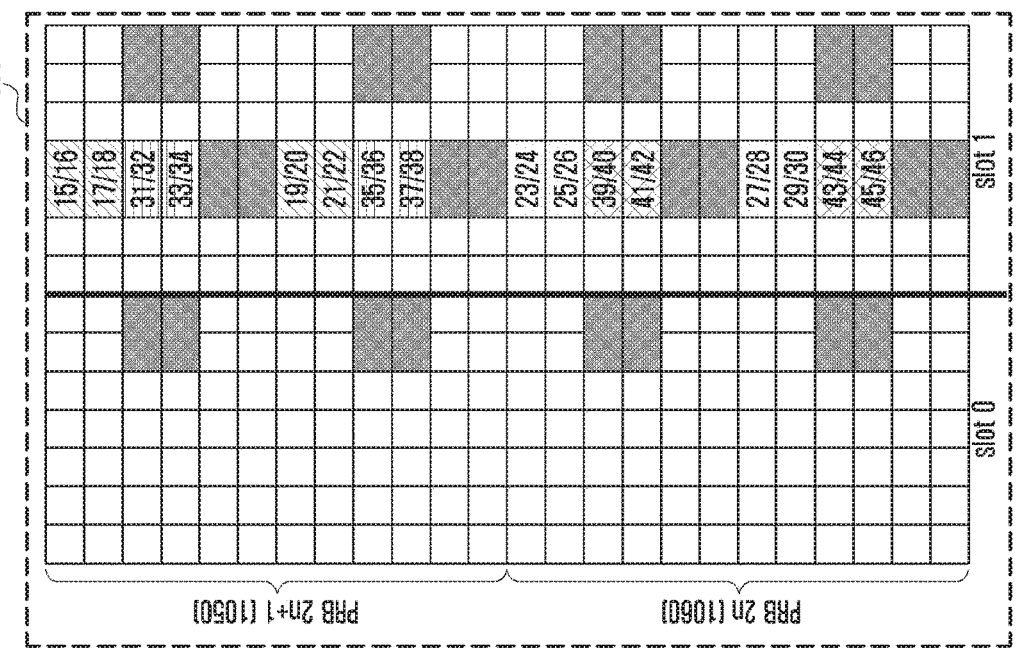
FIG. 10

METHOD AND APPARATUS FOR REFERENCE SIGNAL CONFIGURATIONS FOR CSI-RS PORT SHARING IN MOBILE COMMUNICATION SYSTEM USING MASSIVE ARRAY ANTENNAS

CROSS-REFERENCE TO RELATED APPLICATION(S)

This application is a continuation application of prior application Ser. No. 15/664,641, filed on Jul. 31, 2017, and was based on and claimed priority under 35 U.S.C § 119(a) of a Korean patent application number 10-2016-0097558, filed on Jul. 29, 2016, in the Korean Intellectual Property Office, the disclosure of which is incorporated by reference herein in its entirety.

TECHNICAL FIELD

The present disclosure relates to a general wireless mobile communication system. More particularly, the present disclosure relates to a method for transmitting and receiving channel state information, in which a terminal measures wireless channel quality and reports the measurement result to a base station with respect to signals that are transmitted using various virtualization from a plurality of base stations using a plurality of active array antennas in a wireless mobile communication system that applies a multiple access scheme using a multicarrier, such as an orthogonal frequency division multiple access (OFDMA).

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for configuring channel state information reference signals (CSI-RSs) having various numbers of antenna ports to support a full dimensional multiple-input multiple-output (FD-MIMO) system having various antenna array shapes.

Another aspect of the present disclosure is to provide a base station configure and transmit {1, 2, 4, 8, 12, 16, 24, 32} numbered CSI-RSs to terminals to suit its own antenna array shape. On the other hand, a terminal may have a limited number of CSI-RS ports for receiving the CSI-RSs in accordance with the release of the terminal. For example, in the case where there are terminals having different releases in one cell, the reception abilities of the respective terminals may differ from one another in a manner that some terminals may receive CSI-RSs having maximally up to 8 ports, other terminals may receive CSI-RSs having maximally up to 16 ports, and the remaining terminals may receive CSI-RSs having maximally up to 32 ports.

In accordance with an aspect of the present disclosure, a method for a base station is provided. The method includes transmitting CSI-RS configuration information to a terminal, transmitting feedback configuration information, generating CSI-RSs based on the CSI-RS configuration information to transmit the CSI-RSs, and receiving CSI based on the feedback configuration information wherein the CSI-RSs are transmitted using a plurality of antenna ports, and a number of a plurality of antenna ports is determined in accordance with antenna array configurations included in reference CSI-RS configurations.

In accordance with another aspect of the present disclosure, a method for a terminal is provided. The method includes receiving CSI-RS configuration information from a base station, receiving feedback configuration information, receiving CSI-RSs based on the CSI-RS configuration information, and transmitting CSI generated based on the feedback configuration information and the CSI-RSs, wherein the CSI-RSs are transmitted using a plurality of antenna ports, and a number of a plurality of antenna ports is determined in accordance with antenna array configurations included in reference CSI-RS configurations.

In accordance with another aspect of the present disclosure, a base station is provided. The base station includes a transceiver configured to transmit and receive signals with a terminal, and a controller configured to transmit CSI-RS configuration information to the terminal, transmit feedback configuration information, generate CSI-RSs based on the CSI-RS configuration information to transmit the CSI-RSs, and receive CSI based on the feedback configuration information, wherein the CSI-RSs are transmitted using a plurality of antenna ports, and a number of a plurality of antenna ports is determined in accordance with antenna array configurations included in reference CSI-RS configurations.

In accordance with another aspect of the present disclosure, a terminal is provided. The terminal includes a transceiver configured to transmit and receive signals with a base station, and a controller configured to receive CSI-RS configuration information from the base station, receive feedback configuration information, receive CSI-RSs based on the CSI-RS configuration information, and transmit CSI generated based on the feedback configuration information and the CSI-RSs, wherein the CSI-RSs are transmitted using a plurality of antenna ports, and a number of a plurality of antenna ports is determined in accordance with antenna array configurations included in reference CSI-RS configurations.

In accordance with another aspect of the present disclosure, a method for a base station is provided. The method includes transmitting CSI-RS configuration information to a terminal, transmitting feedback configuration information to the terminal, and transmitting the CSI-RS based on the CSI-RS configuration information, wherein an antenna port number of the CSI-RS transmitted to the terminal is determined based on a component CSI-RS configuration and a maximum number of CSI-RS antenna ports that the terminal is capable of receiving.

In accordance with another aspect of the present disclosure, a method for a terminal is provided. The method includes receiving CSI-RS configuration information from a base station, receiving feedback configuration information from the base station, and receiving the CSI-RS based on the CSI-RS configuration information, wherein an antenna port number of the CSI-RS received from the base station is determined based on a component CSI-RS configuration and a maximum number of CSI-RS antenna ports that the terminal is capable of receiving.

In accordance with another aspect of the present disclosure, a base station is provided. The base station includes a transceiver configured to transmit and receive signals, and a controller coupled with the transceiver and configured to transmit CSI-RS configuration information to a terminal, transmit feedback configuration information to the terminal, and transmit the CSI-RS based on the CSI-RS configuration information, wherein an antenna port number of the CSI-RS transmitted to the terminal is determined based on a component CSI-RS configuration and a maximum number of CSI-RS antenna ports that the terminal is capable of receiving.

In accordance with another aspect of the present disclosure, a terminal is provided. The terminal includes a transceiver configured to transmit and receive signals, and a controller coupled with the transceiver and configured to receive CSI-RS configuration information from a base station, receive feedback configuration information from the base station, and receive the CSI-RS based on the CSI-RS configuration information, wherein an antenna port number of the CSI-RS received from the base station is determined based on a component CSI-RS configuration and a maximum number of CSI-RS antenna ports that the terminal is capable of receiving.

According to the aspects of the present disclosure, a method and an apparatus for generating CSI for performing effective data transmission/reception and sharing the generated CSI in a long term evolution-advanced (LTE-A) based FD-MIMO system. Specifically, the present disclosure provides a method and an apparatus in which a base station notifies a terminal of configuration information for a plurality of CSI-RSs and the terminal generates feedback information in accordance with the configuration information in order to transmit and receive high-efficiency data in the FD-MIMO system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C are diagrams illustrating CSI-RS subgroup generation for full port mapping and partial port mapping in an environment in which 20 transceiver units (TXRUs) exist according to various embodiments of the present disclosure;

FIG. 8 is a diagram illustrating CSI-RS resources having low overhead that may be configured to a terminal according to an embodiment of the present disclosure;

FIG. 10 is a diagram illustrating a resource configuration for each terminal for CSI-RS port sharing according to an embodiment of the present disclosure;

Throughout the drawings, it should be noted that like reference numbers are used to depict the same or similar elements, features, and structures.

DETAILED DESCRIPTION

Figure 1:
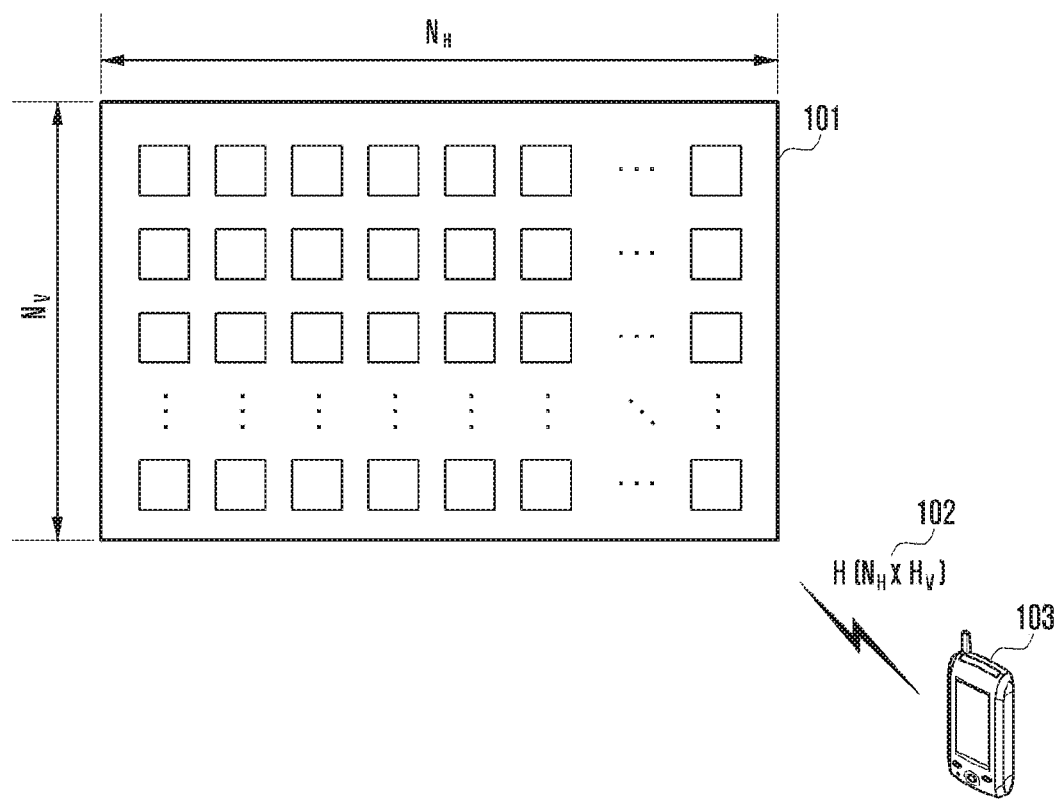
FIG. 1 is a diagram illustrating a massive multi-antenna system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further be separated into additional components and '~units'. In addition, the components and the '~units' may also be implemented to reproduce one or more CPUs within a device or a security multimedia card.

In describing embodiments of the present disclosure, although an orthogonal frequency division multiplexing (OFDM) based wireless communication system, in particular, the $3^{rd}$ generation partnership project (3GPP) Evolved Universal Terrestrial Radio Access (EUTRA) standard, will be the primary subject, the main gist of the present disclosure can be applied to other communication systems having similar technical backgrounds and channel types with slight modifications within a range that does not greatly deviate from the scope of the present disclosure, by the judgment of those skilled in the art to which the present disclosure pertains. The aspects and features of the present disclosure and methods for achieving the aspects and features will be apparent by referring to the embodiments to be described with reference to the accompanying drawings.

However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

At present, a mobile communication system has been developed to a high-speed and high-quality wireless packet data communication system in order to provide massive data services and multimedia services over initial voice oriented services. Several standardization groups, such as 3GPP and Institute of Electrical and Electronics Engineers (IEEE), are proceeding with 3rd-generation evolved mobile communication system standards adopting a multicarrier based multiple access method in order to satisfy such requirements. As a result, various mobile communication standards, such as 3GPP long term evolution (LTE) advanced (LTE-A) and IEEE 802.16m, have been developed to support high-speed and high-quality wireless packet data transmission services based on a multiple access method using multi-carriers.

As described above, the existing 4th-generation evolved mobile communication systems, such as LTE-A and 802.16m, are based on the multi-carrier multiple access method, and use various technologies, such as multiple input multiple output (MIMO, multi-antenna), beam-forming, adaptive modulation and coding (AMC), and channel sensitive scheduling, in order to improve the transmission efficiency. The various technologies as described above increase the system capacity performance by improving the transmission efficiency through methods for concentrating transmission powers transmitted from several antennas, adjusting the amount of data being transmitted, and selectively transmitting data to users having good channel quality, using various kinds of channel state information (CSI).

Since such techniques mostly operate based on CSI between a base station (BS) (that may be mixedly used with an evolved Node B (eNB)) and a terminal (that may be mixedly used with a user equipment (UE) and a mobile station (MS)), it is necessary for the eNB or the UE to measure a channel state between the base station and the terminal, and in this case, a channel state information reference signal (CSI-RS) is used. The above-described eNB indicates a downlink transmission and uplink reception device located in a certain place, and one eNB can perform transmission/reception for a plurality of cells. In one mobile communication system, a plurality of eNBs are geometrically distributed, and each of the plurality of eNBs performs transmission/reception for a plurality of cells.

The existing 3rd-generation and 4th-generation mobile communication systems, such as LTE/LTE-A, use MIMO technology to transmit data using a plurality of transmission/reception antennas for extension of the data transmission speed and system capacity. The MIMO technology makes it possible to spatially separate and transmit a plurality of information streams using a plurality of transmission/reception antennas, and such spatial separation and transmission of the plurality of information streams may be called spatial multiplexing. In general, how many information streams spatial multiplexing can be applied to is defined as a rank of the corresponding transmission, and this rank differs depending on the number of antennas of a transmitter and a receiver. In the case of the MIMO technology that is supported in the standards up to LTE/LTE-A Release 12, spatial multiplexing is supported with respect to cases where 2, 4, and 8 transmission/reception antennas are respectively provided.

In contrast, a massive multi-antenna (massive MIMO) system or a full-dimension MIMO (FD-MIMO) system, to which the technology proposed in the present disclosure is applied, includes 8 or more antennas that are two-dimensionally arranged.

FIG. 1 is a diagram illustrating a massive multi-antenna system according to an embodiment of the present disclosure.

Referring to FIG. 1, a base station transmission equipment 101 transmits a wireless signal using not less than several tens of transmission antennas. As illustrated in FIG. 1, the plurality of transmission antennas are deployed to maintain a certain distance between them. The certain distance may correspond to, for example, a multiple of a half of a wavelength of a wireless signal being transmitted. In general, if the distance corresponding to a half of the wavelength of the wireless signal is maintained between the transmission antennas, signals transmitted from the respective transmission antennas are affected by wireless channels having low correlation between them. As the distance between the transmission antennas becomes longer, the correlation between the signals becomes lower.

In the base station transmission equipment 101 having massive antennas, in order to prevent the scale of the equipment from becoming extremely large, the antennas may be two-dimensionally arranged as illustrated in FIG. 1. In this case, a base station transmits signals using $N_H$ antennas arranged on a horizontal axis and $N_V$ antennas arranged on a vertical axis, and a terminal 103 should measure channels 102 for the corresponding antennas.

In FIG. 1, not less than several tens of transmission antennas arranged on the base station transmission equipment 101 are used to transmit signals to one or a plurality of terminals. Proper precoding may be applied to a plurality of transmission antennas to simultaneously transmit signals to a plurality of terminals. In this case, one terminal may receive one or more information streams. In general, the number of information streams that one terminal can receive is determined in accordance with the number of reception antennas that the terminal possesses and the channel state.

In order to effectively implement the massive multi-antenna system, it is necessary for a terminal to accurately measure the channel state between transmission/reception antennas and the size of interference using a plurality of reference signals and to transmit to a base station effective CSI generated using them. The base station that has received the CSI determines what terminals it performs transmission to in relation to signal transmission of a downlink, at what data transmission speed it performs transmission, and what proceedings it applies. The FD-MIMO system has a large number of transmission antennas, and if a method for transmitting and receiving CSI of the LTE/LTE-A system in the related art is applied, it is necessary to transmit a large amount of control information to cause an uplink overhead problem.

In a mobile communication system, time, frequency, and power resources are limited. Accordingly, if a larger amount of resources is allocated to reference signals, resources to be allocated to traffic channel transmission for transmitting data are reduced to cause an absolute amount of data to be transmitted also to be reduced. In this case, the channel measurement and estimation performance may be improved, but an absolute amount of data to be transmitted is reduced, and thus, the whole system capacity performance may be rather deteriorated.

Accordingly, in order to derive an optimum performance on the side of the whole system capacity, proper distribution is necessary between resources for reference signals and resources for traffic channel transmission.

Figure 2:
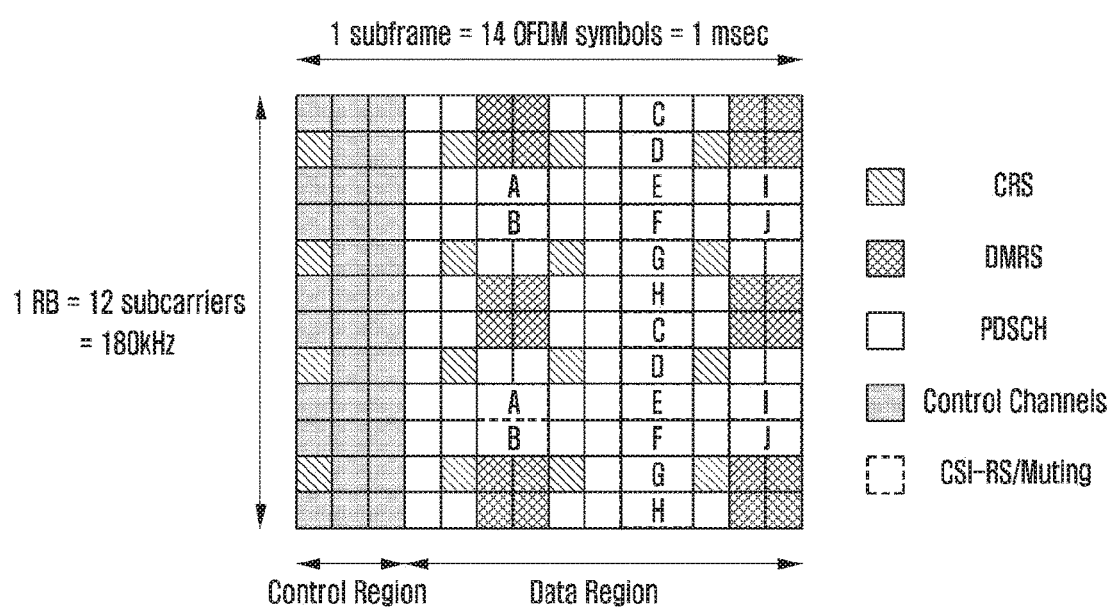
FIG. 2 is a diagram illustrating a wireless resource including one subframe and one resource block (RB), which is a minimum unit capable of performing scheduling to a downlink in a long term evolution (LTE)/LTE-advanced (LTE-A) system according to an embodiment of the present disclosure.

FIG. 2 is a diagram illustrating a wireless resource including one subframe and one resource block (RB), which is a minimum unit capable of performing downlink scheduling in an LTE/LTE-A system according to an embodiment of the present disclosure.

Referring to FIG. 2, a wireless resource including one subframe on a time axis and one RB on a frequency axis is illustrated. The wireless resource includes 12 subcarriers in a frequency domain and 14 OFDM symbols in a time domain to have 168 inherent frequency and time locations in total. In the LTE/LTE-A, each of the inherent frequency and time locations as shown in FIG. 2 is called a resource element (RE).

From the wireless resources as illustrated in FIG. 2, different kinds of plural signals may be transmitted as follows.

1. Cell specific RS (CRS): A reference signal periodically transmitted for all terminals belonging to one cell. A plurality of terminals may commonly use the CRS.

2. Demodulation reference signal (DMRS): A reference signal transmitted for a specific terminal. The DMRS is transmitted only in the case where data is transmitted to the corresponding terminal. The DMRS may be including 8 DMRS antenna ports (hereinafter referred to as "port," which can be mixedly used with an SP) in total. In the LTE/LTE-A, ports 7 to 14 correspond to DMRS ports, and the respective ports maintain orthogonality so that no interference occurs between them using code division multiplexing (CDM) or frequency division multiplexing (FDM).

3. Physical downlink shared channel (PDSCH): A data channel transmitted to a downlink. The PDSCH is used by a base station to transmit traffic to a terminal, and it is transmitted using an RE in which a reference signal is not transmitted through a data region of FIG. 2.

4. CSI-RS: A reference signal transmitted for terminals belonging to one cell. The CSI-RS is used to measure a channel state. A plurality of CSI-RSs may be transmitted to one cell.

5. Other control channels (physical hybrid automatic-repeat-request (HARQ) indicator channel (PHICH), physical control format indicator channel (PCFICH), and physical downlink control channel (PDCCH)): These control channels are used to provide control information that is necessary for a terminal to receive the PDSCH or to transmit acknowledgement (ACK)/negative acknowledgement (NACK) for operating HARQ for data transmission of an uplink.

In addition to the above-described signals, in the LTE-A system, muting may be configured so that CSI-RSs transmitted by other base stations can be received in terminals of the corresponding cell without interference. The muting may be applied in a location in which CSI-RSs can be transmitted, and in general, a terminal receives a traffic signal through jumping over the corresponding wireless resource. In the LTE-A system, the muting may be called zero-power CSI-RS as another term. This is because due to the characteristic of the muting, the muting is applied to the location of the CSI-RS in the same manner and there is not transmission power of the corresponding wireless resource.

Referring to FIG. 2, the CSI-RSs may be transmitted using parts of locations indicated as A, B, C, D, E, E, F, G, H, I, and J in accordance with the number of antennas that transmit the CSI-RSs. Further, the muting may be applied to parts of the locations indicated as A, B, C, D, E, E, F, G, H, I, and J. In particular, the CSI-RSs may be transmitted to 2, 4, and 8 Res in accordance with the number of antenna ports being transmitted. In FIG. 2, if the number of antenna ports is 2, the CSI-RSs are transmitted to a half of a specific pattern, whereas if the number of antenna ports is 4, the CSI-RSs are transmitted to the whole of the specific pattern. If the number of antenna ports is 8, the CSI-RSs are transmitted using two patterns. In contrast, the muting is always performed in one pattern unit. For example, the muting may be applied to a plurality of patterns, but if the location of the muting does not overlap the location of the CSI-RS, it cannot be applied to only a part of one pattern. However, only in the case where the location of the CSI-RS overlaps the location of the muting, the muting can be applied to only a part of one pattern.

In the case where the CSI-RSs for two antenna ports are transmitted, two REs connected together on a time axis transmit signals of respective antenna ports, and the signals of the respective antenna ports are discriminated from one another by orthogonal codes. Further, if the CSI-RSs for four antenna ports are transmitted, signals for the two remaining antenna ports are transmitted in the same method further using two REs added to the CSI-RSs for the two antenna ports. Transmission of the CSI-RSs for 8 antenna ports is performed in the same manner.

In order to improve accuracy of channel estimation, a base station may boost the transmission power of the CSI-RSs. If the CSI-RSs for 4 or 8 antenna ports (APs) are transmitted, specific CSI-RS ports are transmitted from only the CSI-RS RE in a certain location in the same OFDM symbol, but they are not transmitted from other OFDM symbols.

Figure 3:
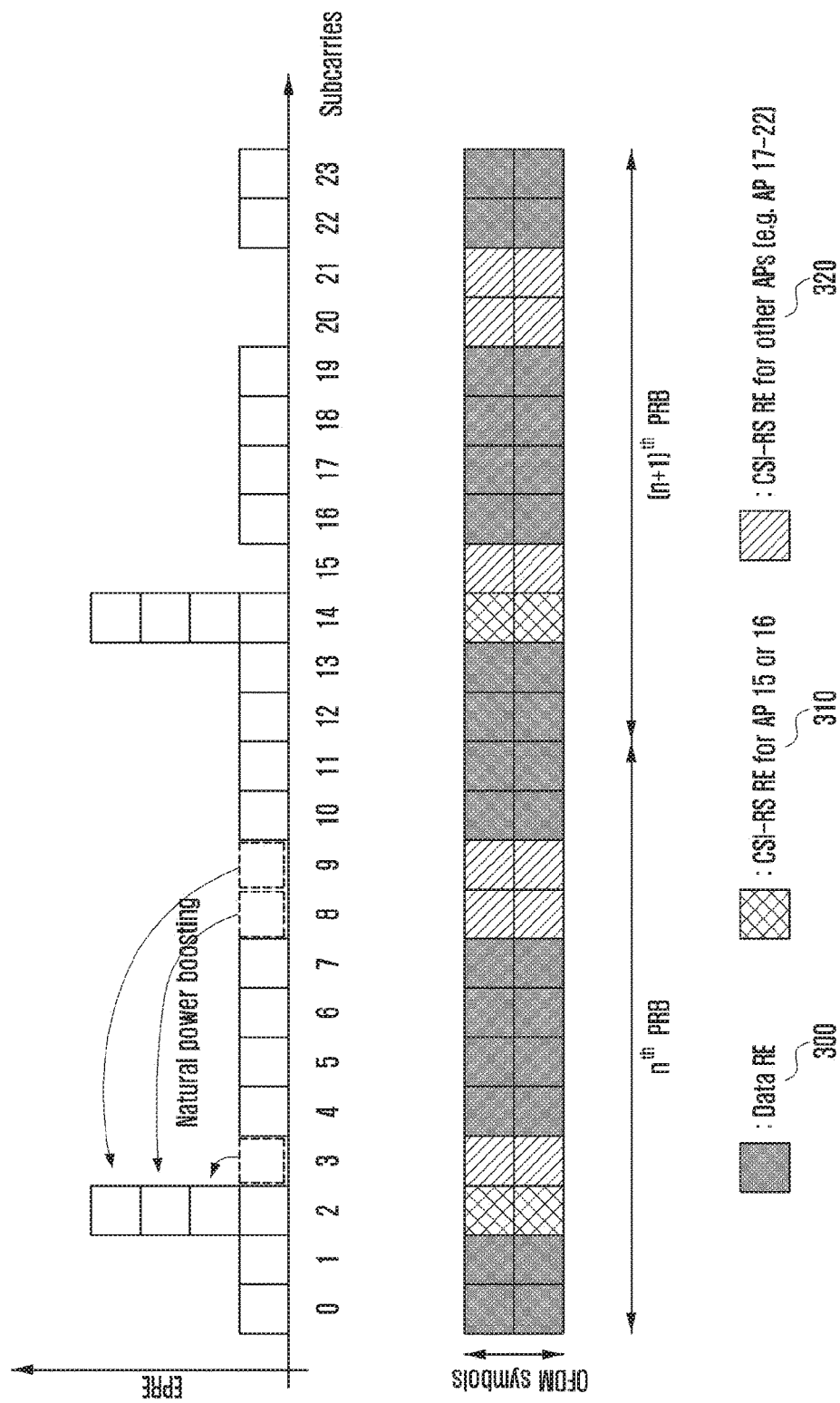
FIG. 3 is a diagram illustrating a channel state information reference signal (CSI-RS) resource element (RE) mapping for an $n^{th}$ and $(n+1)^{th}$ physical resource blocks (PRBs) in a case where a base station transmits channel state information reference signals (CSI-RSs) of 8 antenna ports according to an embodiment of the present disclosure.

FIG. 3 is a diagram illustrating CSI-RS RE mapping for an $n^{th}$ and $(n+1)^{th}$ physical resource blocks (PRBs) in a case where a base station transmits CSI-RSs of 8 antenna ports according to an embodiment of the present disclosure.

Referring to FIG. 3, if the CSI-RS RE location for an AP 15 or 16 is as shown as 310 in FIG. 3, transmission power for the AP 15 or 16 is not used in a CSI-RS RE 320 for the remaining APs 17 to 22. Accordingly, as indicated in FIG. 3, the AP 15 or 16 may use transmission power to be used for the 3rd, 8th, and 9th subcarriers in the 2nd subcarrier. Such natural power boosting enables the transmission power of a CSI-RS port 15 transmitted through the 2nd subcarrier to be highly configured maximally up to 6 dB as compared with the transmission power of a data RE 300. According to the current 2/4/8 port CSI-RS patterns, natural power boosting of 0/3/6 dB becomes possible, and through this, the respective APs can transmit CSI-RSs with full power utilization.

Further, a terminal can be allocated with CSI-interference measurements (IMs) (or interference measurement resources (IMRs)) together with the CSI-RSs, and the CSI-IM resources have the same resource structure and location as those of the CSI-RSs supporting 4 ports. The CSI-IM is a resource for a terminal that receives data from one or more base station to accurately measure interference with an adjacent base station. For example, if it is desired to measure the amount of interference when the adjacent base station transmits data and the amount of interference when the adjacent base station does not transmit the data, the base station configures a CSI-RS and two CSI-IM resources, the base station can effectively measure the amount of interference exerted by the adjacent base station in a manner than it makes the adjacent base station always transmit a signal on one CSI-IM whereas it makes the adjacent base station always not transmit the signal on the other CSI-IM.

In the LTE-A system, the base station may report CSI-RS configuration information to the terminal through higher layer signaling. The CSI-RS configuration information includes an index of CSI-RS configuration information, the number of antenna ports included in a CSI-RS, a transmission period of the CSI-RS, a transmission offset, CSI-RS resource configuration information, CSI-RS scrambling, and quasi co-location (QCL).

In the cellular system, the base station should transmit a reference signal to the terminal in order to measure a downlink channel state, and in the case of the 3GPP LTE-A system, the terminal measures a channel state between the base station and the terminal itself using the CRS or CSI-RS transmitted from the base station. The channel state basically has some requisites that should be considered, and here, it includes the amount of interference in a downlink. The amount of interference in the downlink includes an interference signal and thermal noise generated by antennas that belong to the adjacent base station, and it plays an important role in determining the channel situation of the downlink.

As an example, if a base station having one transmission antenna transmits a signal to a terminal having one reception antenna, the terminal should determine energy per symbol that can be received through the downlink and the amount of interference to be simultaneously received in a section in which the corresponding symbol is received using the reference signal received from the base station, and should determine Es/Io (energy per symbol to interference power ratio). The determined Es/Io is converted into a data transmission speed or a value corresponding to the data transmission speed, and is reported to the base station in the form of a channel quality indicator (CQI) to enable the base station to determine at what data transmission speed the base station is to perform data transmission to the terminal in the downlink.

In the LTE-A system, the terminal feeds information on the channel state of the downlink back to the base station so that the feedback information can be used for downlink scheduling of the base station. For example, the terminal measures the reference signal that the base station transmits to the downlink, and feeds information extracted based on the reference signal back to the base station in the form defined in the LTE/LTE-A standards. In the LTE/LTE-A, information that the terminal feeds back to the base station is briefly classified into three kinds as follows.

Rank indicator (RI): The number spatial layers that the terminal can receive in the current channel state.

Precoding matrix indicator (PMI): an indicator of a precoding matrix to which the terminal prefers in the current channel state.

CQI: The maximum data rate at which the terminal can receive data in the current channel state. The CQI may be replaced by an SINR that can be used similarly to the maximum data rate, maximum error correction code rate and modulation method, and data efficiency per frequency.

The RI, PMI, and CQI have meanings in association with one another. As an example, the precoding matrix supported in the LTE/LTE-A is differently defined by ranks. Accordingly, although the PMI value when RI has a value of "1" and the PMI value when RI has a value of "2" are equal to each other, they are differently interpreted. Further, it is assumed that the rank value and the PMI value that the terminal reported to the base station has been applied to the base station even in the case where the terminal determines the CQI. For example, if the rank is RI_X and the precoding is PMI_Y in the case where the terminal has reported RI_X, PMI_Y, and CQI_Z to the base station, it indicates that the terminal can receive the data rate corresponding to the CQI_Z. As described above, the terminal assumes in what transmission method the terminal performs transmission to the base station when calculating the CQI, and thus, it can obtain an optimum performance when performing actual transmission in the corresponding transmission method.

In the case of a base station that possesses a massive antenna to perform the channel information generation and report, it is necessary for the base station to configure reference signal resources for measuring channels of 8 or more antennas to transmit the reference signal resources to the terminal. As illustrated in FIG. 2, although an available CSI-RS resource can use maximally 48 REs, It is currently possible to configure up to 8 CSI-RSs for one CSI process. Accordingly, there is a need for a new CSI-RS configuration method to support an FD-MIMO system that can operate based on 8 or more CSI-RS ports.

As an example, in the LTE/LTE-A release 13, 1, 2, 4, 8, 12, or 16 CSI-RS ports may be configured in one CSI process. Specifically, {1, 2, 4, 8}-port CSI-RS follow the existing mapping rule, 12-port CSI-RS is configured as an aggregation of three 4-port CSI-RS patterns, and 16-port CSI-RS is configured as an aggregation of two 8-port CSI-RS patterns.

Further, in the LTE/LTE-A release 13, CDM-2 or CDM-4 is supported using an orthogonal cover code (OCC) of length 2 or 4 with respect to 12-/16-port CSI-RSs. The above explanation of FIG. 3 refers to CSI-RS power boosting based on CDM-2, and according to the above explanation, maximally 9 dB power boosting is necessary in comparison to the PDSCH for full power utilization for the 12-/16-port CSI-RSs based on CDM-2. This indicates that high-performance hardware is necessary in comparison to the existing one for the full power utilization during operation of the 12-/16-port CSI-RSs based on CDM-2. In the release 13, in consideration of this, the 12-/16-port CSI-RSs based on CDM-4 have been introduced, and in this case, the full power utilization becomes possible through the existing 6 dB power boosting.

Currently, with the increase of dynamic precoding demands in the vertical direction, lively discussions have been developed on FD-MIMO including uniform planar array (UPA) antenna ports. As described above, the number of CSI-RS ports that can be currently configured in one CSI process is limited to {(1 or 2), 4, 8, 12, 16}. Accordingly, in order to support an FD-MIMO system having various two dimensional (2D) antenna array shape, there is a need for a method for configuring CSI-RSs including various numbers of antenna ports, such as {18, 20, 22, 24, 26, 28, 30, 32}.

The present disclosure has been made to solve the above problem, and provides a method and an apparatus for generating CSI in order to perform effective data transmission/reception and sharing the generated CSI in an LTE-A based FD-MIMO system. Specifically, in order to perform high-efficiency data transmission/reception in an FD-MIMO system according to an embodiment of the present disclosure, a method and an apparatus are provided, in which a base station notifies a terminal of configuration information for a plurality of CSI-RSs, and the terminal generates feedback information in accordance with the configuration information.

As described above, the FD-MIMO base station should configure and transmit to the terminal reference signal resources for measuring channels for 8 or more antennas, and in this case, the number of reference signals may differ in accordance with the base station antenna configuration and measurement types. As an example, in the LTE/LTE-A release 13, it is possible to configure {1, 2, 4, 8, 12, 16}-port CSI-RSs on the assumption of the full port mapping. Here, the full port mapping indicates that all transceiver units (TXRUs) have dedicated CSI-RS ports for channel estimation.

On the other hand, after LTE/LTE-A release 14 as described above, there is a high possibility that 16 or more TXRUs are introduced. Further, supportable antenna array shapes will be greatly increased in comparison to the release 14. This indicates that various numbers of TXRUs should be supported in the LTE/LTE-A release 14.

Table 1 below is an available 2D antenna array structure list. In Table 1, {18, 20, 22, 24, 26, 28, 30, 32}-port CSI-RSs have been considered, and considering that two different polarization antennas may exist in the same location in a polarization antenna structure, {9, 10, 11, 12, 13, 14, 15, 16} numbered different AP locations may be considered. On the other hand, a 2D rectangular or square antenna array shape may be presented by the number $N_1$ of different AP locations in the first dimension (in vertical or horizontal direction) and the number $N_2$ of different AP locations in the second dimension (in horizontal or vertical direction), and possible aggregations in the respective port numbers are ($N_1$, $N_2$) of Table 1. Table 1 indicates that various antenna array shapes may exist in accordance with the number of CSI-RS ports.

TABLE 1

| Number of aggregated CSI-RS ports | Number of aggregated CSI-RS ports per polarization | Available 2D antenna array geometry, ($N_1$, $N_2$) (1D configurations were omitted) | | | | Impact on 2D RS and feedback design |
|---|---|---|---|---|---|---|
| 18 | 9  | (3, 3) | —      | —      | —      | Low  |
| 20 | 10 | (2, 5) | (5, 2) | —      | —      | Med  |
| 22 | 11 | —      | —      | —      | —      | —    |
| 24 | 12 | (2, 6) | (3, 4) | (4, 3) | (6, 2) | High |
| 26 | 13 | —      | —      | —      | —      | —    |
| 28 | 14 | (2, 7) | (7, 2) | —      | —      | Med  |
| 30 | 15 | (3, 5) | (5, 3) | —      | —      | Med  |
| 32 | 16 | (2, 8) | (4, 4) | (8, 2) | —      | High |

As described above, in order to support 16 or more CSI-RS ports, it is necessary to consider various items as follows.

A method for configuring CSI-RSs including a large number of ports suitable for various 2D antenna array shapes including a cross polarization structure and channel states A method for reducing CSI-RS resource overhead due to a large number of CSI-RS ports In embodiments described hereinafter, a method for configuring a plurality of CSI-RS ports in consideration of one or more of the above-described items will be described. Although embodiments are decomposedly described for convenience in explanation, they are not independent from each other, and two or more embodiments may be aggregated to be applied.

In an embodiment of the present disclosure, a time-frequency resource region including the whole or a part of configured CSI-RS ports is expressed as a CSI-RS PRB pair or a CSI-RS PRB, and it can be expressed as several similar meanings, such as CSI-RS subframe, CSI-RS subband, and CSI-RS bandwidth.

Further, in an embodiment of the present disclosure, although restriction so as to generate the CSI using a part of the RSs transmitted to the whole bands or the whole RS subframes is expressed as frequency comb/time comb transmission, it can be named as similar expressions, such as frequency/time measurement restriction and frequency/time measurement window.

First Embodiment

One method to reduce a CSI-RS resource overhead is to lower the density of CSI-RS REs. For this, it can be configured that the CSI-RS transmission resource is decomposed into several groups including different time or frequency resources and respective CSI-RS ports are transmitted from only parts of the groups.

In the standards up to the LTE/LTE-A release 13, CSI-RSs are transmitted over the whole band, and PRBs from which the CSI-RSs are transmitted are determined to include the CSI-RS REs for all the CSI-RSs. For example, the density of the CSI-RS RE is 1RE/port/PRB. On the other hand, methods as illustrated in FIG. 4 can be hereafter used in order to support 16 or more CSI-RS ports, in order to provide UE-specific beamformed CSI-RSs to a plurality of terminals, or in order to provide many kinds of cell-specific beamformed CSI-RSs.

As an example, the whole CSI-RS ports may be decomposed into two or more subgroups by a certain basis. The CSI-RS subgroup may be explicitly reported to the terminal by higher layer signaling or physical layer signaling, or may be explicitly/suggestively reported to the terminal by one or more CSI-RS resource configuration lists or one or more CSI-RS configuration lists.

Figure 4A:
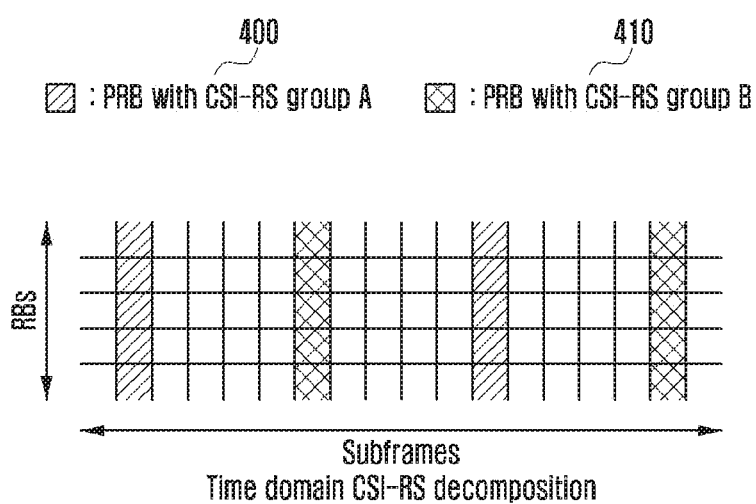
FIGS. 4A and 4B are diagrams illustrating CSI-RS subgroup mapping on a time axis or a frequency axis according to various embodiments of the present disclosure.
Figure 4B:
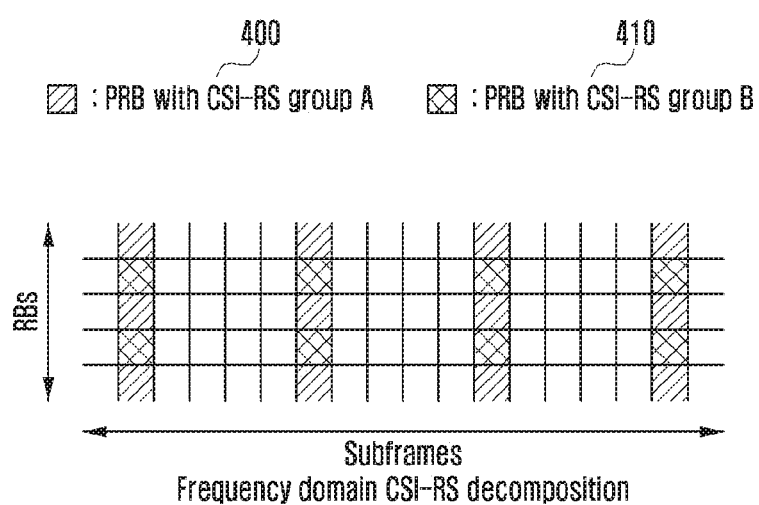

The decomposed CSI-RS ports may be transmitted from different resources by subgroups. FIGS. 4A and 4B are diagrams illustrating an example of CSI-RS subgroup mapping on time axis or frequency axis. For example, it is assumed that the whole CSI-RS ports are decomposed into two subgroups, that is, group A 400 and group B 410. In this case, as shown in FIG. 4A, the CSI-RSs belonging to group A and group B are transmitted over the whole frequency band, but may be decomposed through different time resources (subframes) to be transmitted. Further, as shown in FIG. 4B, the CSI-RSs are transmitted from all CSI-RS subframes (i.e., transmitted over the whole time axis), but may be decomposed through different PRBs to be transmitted. FIGS. 4A and 4B are merely exemplary, and it is not necessary that distributions of time or frequency resources are always equal to each other by CSI-RS port subgroups as shown in FIGS. 4A and 4B. Further, it is apparently possible to allocate a larger number of resources to important subgroups.

It is also possible that the above example is functionally equally analyzed as follows. The whole CSI-RS REs may be decomposed into two or more subgroups by a certain basis. The CSI-RS RE subgroup may be explicitly reported to the terminal by higher layer signaling or physical layer signaling, or may be explicitly/suggestively reported to the terminal by one or more CSI-RS resource configuration lists or one or more CSI-RS resource configuration lists. The CSI-RS ports may be transmitted from at least one of the decomposed CSI-RS RE subgroups. For example, it is assumed that the whole CSI-RS REs are decomposed into two subgroups, that is, group A and group B. In this case, as shown in FIG. 4A, the CSI-RS ports transmitted from the subgroups A and B are transmitted over the whole frequency band, but may be decomposed through different time resources (subframes) to be transmitted. Further, as shown in FIG. 4B, the CSI-RS ports are transmitted from all CSI-RS subframes (i.e., transmitted over the whole time axis), but may be decomposed through different PRBs to be transmitted. FIGS. 4A and 4B are merely exemplary, and it is not necessary that distributions of time or frequency resources are always equal to each other by CSI-RS RE subgroups as shown in FIGS. 4A and 4B. Further, it is apparently possible to allocate a larger number of resources to important subgroups.

In the present disclosure as described above, the CSI-RS subgroup may be analyzed as a port subgroup or RE subgroup, and one method may be switched to the other method through a similar way. Accordingly, the CSI-RS subgroup may be commonly called as "subgroup" or "CSI-RS subgroup".

FIGS. 4A and 4B are diagrams illustrating CSI-RS subgroup mapping on a time axis or frequency axis according to various embodiments of the present disclosure.

Referring to FIGS. 4A and 4B, such subgroup configuration can make RS intervals uniform, and thus terminal implementation can be simplified. However, it is not necessary to limit the actual subgroup configuration to the comb type, and it is also possible to engage transmission in a specific band for each subgroup, such as localized transmission.

As an example to configure the CSI-RS subgroups (or component (or reference) CSI-RS resources, it is possible to tie the CSI-RS ports in the first or second direction (vertical or horizontal direction) or per polarization. A CSI-RS port index may be configured by a base station to a terminal using signaling, and the signaling may include both higher layer signaling and physical layer signaling. The CSI-RS subgroup configuration method can be applied in various manners in accordance with the antenna array shape or channel state. For example, if the first-direction array size $N_1$ is smaller than the second-direction array size $N_2$, the system performance may be more greatly affected by the second-direction component, or in a situation in which the antenna array size is very large and several UEs discriminate channels of several UEs through a direction component other than a co-phasing component, it will be important to accurately measure the direction component through subgroup configuration per polarization.

Figure 5C:
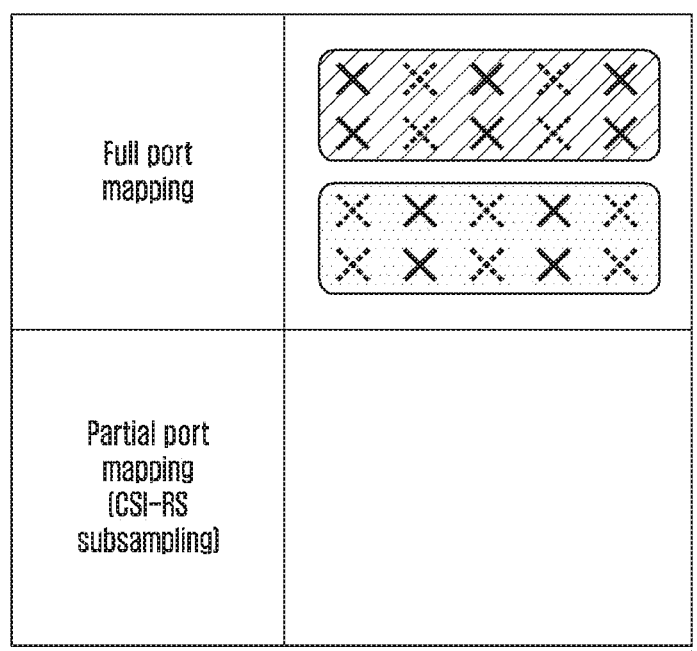

FIGS. 5A and 5B are diagrams illustrating CSI-RS subgroup generation for full port mapping and partial port mapping in an environment in which 20 TXRUs exist according to various embodiments of the present disclosure.

Referring to FIGS. 5A and 5B, 500 and 510 denote first and second CSI-RS subgroups. Further, a solid line indicates TXRUs to which CSI-RS ports are allocated in the corresponding CSI-RS subgroups, and a dotted line indicates TXRUs to which CSI-RS ports are not allocated in the corresponding CSI-RS subgroup.

In FIG. 5A, full port mapping (a) exemplifies CSI-RS subgroup generation per polarization. According to the full port mapping (a) of FIG. 5, 10 CSI-RS ports corresponding to −45°-pol AP may be allocated to the first CSI-RS subgroup 500, and 10 CSI-RS ports corresponding to +45°-pol AP may be allocated to the second CSI-RS subgroup 510. Full port mapping (b) and (c) of FIG. 5 exemplifies CSI-RS subgroup generation per direction. According to the full port mapping (b) of FIG. 5, the respective CSI-RS subgroups may include the same number of vertical or horizontal-direction CSI-RS ports. In particular, according to full port mapping (c) of FIG. 5, the respective CSI-RS subgroups may include several kinds of vertical or horizontal-direction CSI-RS ports, and each subgroup may include different numbers of CSI-RS ports.

In FIG. 5B, the partial port mapping indicates that partial TXRUs have dedicated CSI-RS ports for channel estimation, but other partial TXRUs do not have corresponding CSI-RS ports. The partial port mapping (a) of FIG. 5 exemplifies CSI-RS subgroup generation per direction. In this example, the first CSI-RS subgroup includes 10 horizontal-direction CSI-RS ports, and the second CSI-RS subgroup includes 4 vertical-direction CAI-RS ports. In this case, partial TXRUs may not be allocated with the CSI-RS ports. The partial port mapping (b) of FIG. 5 exemplifies CSI-RS subgroup generation per polarization, and in this case, −45° or +45°-pol APs are all allocated to the first CSI-RS subgroup without subsampling. Through this, the terminal can properly estimate co-phasing information of the channel.

CSI-RS overhead reduction through partial port mapping may be similarly performed even without CSI-RS subgroup configurations.

Figure 6A:
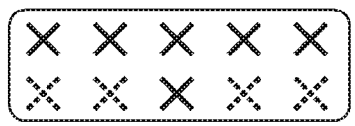
FIGS. 6A and 6B are diagrams illustrating partial port mapping being performed without CSI-RS subgroup configurations according to various embodiments of the present disclosure.
Figure 6B:
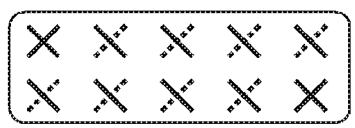

FIGS. 6A and 6B are diagrams illustrating partial port mapping being performed without CSI-RS subgroup configurations according to various embodiments of the present disclosure.

Referring to FIG. 6A, the partial port mapping of FIG. 5A may be performed within one CSI-RS resource. As another example, FIG. 6B shows that the partial port mapping of FIG. 5B may be performed within one CSI-RS resource. FIG. 6B illustrates a situation in which only two CSI-RS ports are configured for +45°-pol AP.

The examples in Table 1 and FIG. 5 as described above mean that the number of CSI-RS subgroups or components (CSI-RS resources) and the number of CSI-RS ports included in each CSI-RS subgroup may differ depending on the situation. Accordingly, in order to support this, there is a need for a CSI-RS resource decomposition method with a flexible structure. For example, the base station may differently configure a CSI-RS transmission period and whether to transmit (or configure) CSI-RS subbands by CSI-RS subgroups. Further, the different CSI-RS subgroups may be including different numbers of CSI-RS ports.

As one example to perform this, comb configuration (time comb ($comb_T$) and/or frequency comb ($comb_F$) may be defined on the time or frequency axis. The base station may respectively or simultaneously configure the $comb_T$ or $comb_F$, and may report to the terminal from what time/frequency resources the respective CSI-RS subgroups are to be transmitted.

Figure 7:
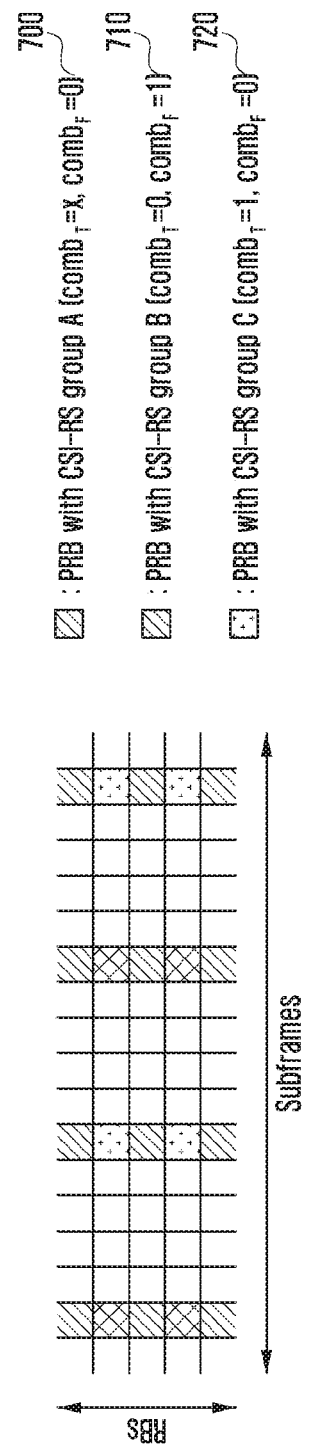
FIG. 7 is a diagram illustrating CSI-RS configurations by $comb_T$ or $comb_F$ according to an embodiment of the present disclosure.

FIG. 7 is a diagram illustrating CSI-RS configurations by $comb_T$ or $comb_F$, according to an embodiment of the present disclosure.

Referring to FIG. 7, the base station may configure a time comb to $comb_T \in \{X, 0, 1\}$ with respect to the time axis. Here, X indicates that the time comb is not applied, i.e., that the corresponding CSI-RS subgroup is transmitted from all CSI-RS subframes. Here, "0" indicates that the CSI-RS subgroups are transmitted from odd CSI-RS subframes, and "1" indicates that CSI-RS subgroups are transmitted from even CSI-RS subframes. The meanings of X, 0, and 1 are examples of time comb configuration, and it is apparent that they may be determined with various meanings when they are actually applied.

Referring to FIG. 7, it is assumed that the CSI-RS transmission period is set to 5 ms. In an example of FIG. 7, it can be seen that the time comb of CSI-RS subgroup A 700 is configured to $comb_T=X$, and CSI-RS ports belonging to subgroup A are transmitted from all the CSI-RS subgroups having 5 ms period. On the other hand, time combs of CSI-RS subframe B 710 and CSI-RS subgroup C 720 are set to "0" and "1," and it can be seen that CSI-RS ports belonging to subgroup B are transmitted for each 10 ms from odd CSI-RS subframes, and CSI-RS ports belonging to subgroup C are transmitted for each 10 ms from even CSI-RS subframes.

Even with respect to frequency combs, it is possible to apply similar configuration to the time comb. In an example of FIG. 7, the base station may configure a frequency comb to $comb_F \in \{X, 0, 1\}$ with respect to the frequency axis. Here, X indicates that the frequency comb is not applied, i.e., that the corresponding CSI-RS subgroup is transmitted from all PRBs. Here, "0" indicates that the CSI-RS subgroups are transmitted from odd PRBs, and "1" indicates that CSI-RS subgroups are transmitted from even PRBs. The meanings of X, 0, and 1 are examples of frequency comb configuration, and it is apparent that they may be determined with various meanings (e.g., in the unit of several PRB groups) when they are actually applied.

In an example of FIG. 7, it can be seen that the frequency comb of CSI-RS subgroup A 700 is configured to $comb_F=0$, and CSI-RS ports belonging to subgroup A are transmitted from odd PRBs. On the other hand, frequency combs of CSI-RS subframe B 710 and CSI-RS subgroup C 720 are set to "1," and CSI-RS ports belonging to subgroups B and C are transmitted from even PRBs.

As another example of CSI-RE subgroup configuration, there is a method for explicitly individually configure CSI-RS resources used to transmit respective CSI-RS subgroups. In this example, CSI-RS configuration information, such as CSI-RS transmission period, transmission offset, CSI-RS resource index, a list of indexes, or information on the CSI-RS transmission band, may be separately configured by CSI-RS subgroups. Further, the base station may report to the terminal what CSI-RS port is included in the CSI-RS subgroups through higher layer signaling or physical layer signaling.

Referring to Tables 2-1 to 2-4 below, a CSI process includes at least one CSI-RS resource configuration, and each CSI-RS resource configuration can be configured as one of a non-precoded CSI-RS and beamformed CSI-RSs.

First, the CSI-RS resource configuration that is configured as non-precoded CSI-RSs includes at least one CSI-RS configuration, and each CSI-RS configuration includes antennaPortsCount-numbered CSI-RS REs. For example, if one non-precoded CSI-RS has N CSI-RS configurations, and is configured to antennaPortsCount=P, the total number of CSI-RS REs that are used for the non-precoded CSI-RSs becomes NP. In the case of the non-precoded CSI-RSs, the unit of the CSI-RS subgroup may be the CSI-RS resource configuration or CSI-RS configuration.

If the unit of the CSI-RS subgroup is the CSI-RS resource configuration, this indicates that the same subgroup configuration is applied to all CSI-RS configurations constituting one CSI-RS resource configuration. Table 2-1 below relates to CSI-RS comb type configuration by CSI-process information elements. If subgroups are configured in time/frequency comb type, TM10 terminal that uses a CSI process may be added with resource radio control (RRC) parameters, such as (2-1-00) or (2-1-01) in Table 2-1. In Table 2-1, (2-1-00) performs signaling of a subgroup shape in a frequency domain, and (2-1-01) performs signaling of a subgroup shape in a time domain. In this case, X and Y mean the number of subgroup shapes in the frequency/time domains. For example, if two kinds of comb types are supported in the frequency domain and no subgroup exists in the time domain, X becomes "1," and (2-1-00) may not be configured or defined. Similarly to this, it is also possible to use (2-1-00) or (2-1-01) for the purpose of signaling processing granularity in the frequency/time domain. For example, if (2-1-00) has a value of "1," it may be analyzed that frequency measurement restriction is turned on, and independent channel estimation by PRBs should be performed, or channel estimation should be performed by certain PRB groups. As another example, if (2-1-00) has a value of "4," it may be analyzed that frequency measurement restriction is turned on, and channel estimation may be performed through grouping of four PRBs.

Table 2-2 relates to CSI-RS comb type configuration by CSI-RS comb type configuration by CSI-RS-config information elements. In the case of TM9 terminal, the CSI process is not configured, and thus it is possible to perform signaling of the frequency or time domain subgroup shapes, such as (2-2-00) or (2-2-01). Since the detailed explanation is similar to that of the TM10 terminal, it will be omitted.

As another example of subgroup configuration, if the unit of the CSI-RS subgroup becomes CSI-RS configuration, this indicates that independent subgroup configuration is applied to individual CSI-RS configurations. Of course, even in this case, it is apparent that the same subgroup shape can be applied to all CSI-RS configurations in accordance with higher layer configuration. Table 2-3 relates to CSI-RS comb type configuration by CSI-RS-ConfigNZP information elements. In Table 2-1 below, one CSI process may be configured to nonPrecoded-r13 or beamformed-r13 of Table 2-2 below by RRC parameter eMIMO-Type-r13. If the one CSI process is configured to non-precoded CSI-RSs, the terminal may configure one CSI-RS resource through aggregation of one of resourceConfig-r10 in Table 2-2 and resourceConfig-r11 of table 2-3 with nzp-resourceConfigList-r13 in Table 2-3. In this example, in order for different subgroup designations by resourceConfig to become possible, RRC parameters, such as (2-2-00), (2-2-01), (2-2-02), (2-2-03), (2-2-04), (2-2-10), (2-2-11), (2-2-16), (2-2-17) in Table 2-2, may be defined. Here, (2-2-16) and (2-2-17) respectively perform signaling of subgroup shapes in the frequency/time domains, and X and Y indicates the numbers of subgroup shapes in the respective domains. The detailed explanation thereof may refer to the above-described examples. It is also possible that the signaling presents the same meaning as information elements related to respective CSI-RS configurations (resourceConfig), such as (2-2-02), (2-2-03), and (2-2-04), through (2-2-10) or (2-2-11) that are separate lower layer information elements. It is also possible that (2-2-04) is defined in the same manner as (2-3-02) in Table 2-3.

Second, the terminal may be configured to receive the beamformed CSI-RSs. In the case of the beamformed CSI-RS, it is possible to configure at least one CSI-RS resource configuration in one CSI process. In this case, respective CSI-RS resource configurations include one CSI-RS configuration value. Specifically, the terminal may receive signaling of minimally one to maximally 8 CSI-RS configurations (resourceConfig) through one of resourceConfig-r10 in Table 202 and resourceConfig-r11 in Table 2-3 and csi-RS-ConfigNZPIdListExt in Table 2-2. In this example, in order for different subgroup designations by resourceConfigs to become possible, RRC parameters, such as (2-2-00), (2-2-01), (2-2-02), (2-2-03), (2-2-06), (2-2-10), (2-2-11), (2-2-16), and (2-2-17) in Table 2-2, may be defined. In the case of beamformed CSI-RSs, one subgroup configuration by respective CSI-RS resource configurations is possible, and CSI-RS ports included in the same CSI-RS resource configuration are not included in different subgroups. Since the relationship between the respective parameters is similar to that of non-precoded CSI-RSs, the detailed explanation thereof will be omitted.

Although the above-described examples have been described based on non-zero power (NZP) CSI-RS configurations, it is possible to apply the same subgroups as the NZP CSI-RS even to zero power (ZP) CSI-RS and CSI-IM. The ZP CSI-RS and the CSI-IM may be used for the purpose of lowering inter-cell interference by the CSI-RS or of measuring the interference using the CSI-RS resources. Accordingly, if the CSI-RS is transmitted in accordance with the subgroup configuration, it is necessary for suitable subgroup configuration to be applied to the ZP CSI-RS and the CSI-IM to match the same. Table 2-4 relates to ZP CSI-RS comb type configurations by CSI-RS-ConfigZP information elements. For this, RRC parameters may be defined, such as (2-2-05), (2-2-07), (2-2-08), (2-2-09), (2-2-12), (2-2-13), (2-2-14), and (2-2-15) in Table 2-2, and (2-4-00), (2-4-01), (2-4-02), (2-4-03), and (2-4-05) in Table 2-4. Since the relationship between the respective parameters is similar to that of NZP CSI-RSs, the detailed explanation thereof will be omitted. In this case, (2-4-00) and (2-4-01) may not be simultaneously configured or defined. Here, (2-4-00) has the feature capable of configuring different subgroups by 4-port CSI-RSs designated by the respective ZP CSI-RS resourceConfigList, and (2-4-01) configures the same subgroup in all 4-port CSI-RSs designated by 16-bit ZP CSI-RS resourceConfigList bit map.

TABLE 2-1

```
-- ASN1START
CSI-Process-r11 ::=        SEQUENCE {
        csi-ProcessId-r11               CSI-ProcessId-r11,
        csi-RS-ConfigNZPId-r11          CSI-RS-ConfigNZPId-r11,
        csi-IM-ConfigId-r11             CSI-IM-ConfigId-r11,
        p-C-AndCBSRList-r11             SEQUENCE (SIZE (1..2)) OF P-C-AndCBSR-r11,
        cqi-ReportBothProc-r11          CQI-ReportBothProc-r11
        cqi-ReportPeriodicProcId-r11    INTEGER (0..maxCQI-ProcExt-r11)
        cqi-ReportAperiodicProc-r11     CQI-ReportAperiodicProc-r11
        ...,
        < Portions of which explanation is unnecessary are omitted >
        [[      cqi-ReportAperiodicProc-v1310 CHOICE {
                        release                         NULL,
                        setup                           CQI-
ReportAperiodicProc-v1310
                }
                cqi-ReportAperiodicProc2-v1310 CHOICE {
                        release                         NULL,
                        setup                           CQI-
ReportAperiodicProc-v1310
                }
                eMIMO-Type-r13                  CSI-RS-
ConfigEMIMO-r13
        ]]
        [[      transmissionComb-Freq           INTEGER   {0..X}    →
(2-1-00)
                transmissionComb-Time           INTEGER   {0..Y}    →
(2-1-01)
        ]]
}
< Portions of which explanation is unnecessary are omitted >
-- ASN1STOP
```

TABLE 2-2

```
-- ASN1START
CSI-RS-Config-r10 ::=          SEQUENCE {
    csi-RS-r10                 CHOICE {
        release                            NULL,
        setup                              SEQUENCE {
            antennaPortsCount-r10          ENUMERATED  {an1,
an2, an4, an8},
            resourceConfig-r10             INTEGER (0..31),
            subframeConfig-r10             INTEGER (0..154),
            p-C-r10
    INTEGER (–8..15)
        }
    }
    zeroTxPowerCSI-RS-r10      ZeroTxPowerCSI-RS-Conf-r12
    [[  transmissionComb-Freq              INTEGER    {0..X}       →
(2-2-00)
        transmissionComb-Time              INTEGER    {0..Y}       →
(2-2-01)
    ]]
}
CSI-RS-Config-v1250 ::=        SEQUENCE {
    zeroTxPowerCSI-RS2-r12     ZeroTxPowerCSI-RS-Conf-r12
    ds-ZeroTxPowerCSI-RS-r12   CHOICE {
        release                            NULL,
        setup                              SEQUENCE {
            zeroTxPowerCSI-RS-List-r12     SEQUENCE        (SIZE
(1..maxDS-ZTP-CSI-RS-r12)) OF ZeroTxPowerCSI-RS-r12
        }
    }
}
CSI-RS-Config-v1310 ::=        SEQUENCE {
    eMIMO-Type-r13             CSI-RS-ConfigEMIMO-r13
    [[  transmissionComb-Freq              INTEGER    {0..X}       →
(2-2-02)
        transmissionComb-Time              INTEGER    {0..Y}       →
(2-2-03)
    ]]
}
CSI-RS-ConfigEMIMO-r13 ::=    CHOICE {
    release                                NULL,
    setup                                  CHOICE {
        nonPrecoded-r13                    CSI-RS-ConfigNonPrecoded-
r13,
        beamformed-r13                     CSI-RS-ConfigBeamformed-
r13
    }
}
CSI-RS-ConfigNonPrecoded-r13 ::=           SEQUENCE {
    p-C-AndCBSRList-r13                            P-C-AndCBSR-
PerResourceConfig-r13
    codebookConfigN1-r13                   ENUMERATED      {n1,
n2, n3, n4, n8},
    codebookConfigN2-r13                   ENUMERATED      {n1,
n2, n3, n4, n8},
    codebookOverSamplingRateConfig-O1-r13  ENUMERATED {n4, n8}
    codebookOverSamplingRateConfig-O2-r13  ENUMERATED {n4,n8}
    codebookConfig-r13                             INTEGER (1..4),
    csi-IM-ConfigIdList-r13                SEQUENCE       (SIZE
(1..2)) OF CSI-IM-ConfigId-r13
    csi-RS-ConfigNZP-EMIMO-r13             CSI-RS-ConfigNZP-
EMIMO-r13
    [[  NZP-TransmissionCombList           SEQUENCE       (SIZE
(1..2))                OF              NZP-TransmissionComb
                                → (2-2-04)
        IM-TransmissionCombList            SEQUENCE       (SIZE
(1..2))                OF              IM-TransmissionComb
                                → (2-2-05)
    ]]
}
CSI-RS-ConfigBeamformed-r13 ::=            SEQUENCE {
    csi-RS-ConfigNZPIdListExt-r13          SEQUENCE (SIZE (1..7)) OF
CSI-RS-ConfigNZPId-r13
    csi-IM-ConfigIdList-r13                SEQUENCE       (SIZE
(1..8)) OF CSI-IM-ConfigId-r13
    p-C-AndCBSR-PerResourceConfigList-r13  SEQUENCE (SIZE (1..8)) OF
P-C-AndCBSR-PerResourceConfig-r13
    ace-For4Tx-PerResourceConfigList-r13 SEQUENCE     (SIZE    (1..7))    OF
BOOLEAN
    alternativeCodebookEnabledBeamformed-r13   ENUMERATED {true}
    channelMeasRestriction-r13             ENUMERATED      {on}
```

TABLE 2-2-continued

```
        [[      NZP-TransmissionCombList           SEQUENCE    (SIZE
(1..7))                         OF                 NZP-TransmissionComb
                                → (2-2-06)
                IM-TransmissionCombList            SEQUENCE    (SIZE
(1..8))                         OF                 IM-TransmissionComb
                                → (2-2-07)
        ]]
}
ZeroTxPowerCSI-RS-Conf-r12 ::=      CHOICE {
        release                                    NULL,
        setup                                      ZeroTxPowerCSI-RS-
r12
}
ZeroTxPowerCSI-RS-r12 ::=       SEQUENCE {
        zeroTxPowerResourceConfigList-r12          BIT STRING (SIZE (16)),
        zeroTxPowerSubframeConfig-r12              INTEGER (0..154)
        [[      ZP-TransmissionCombList            SEQUENCE (SIZE (1..16)) OF
ZP-TransmissionComb
                                → (2-2-08)
                ZP-TransmissionComb                ZM-TransmissionComb
                    → (2-2-09)
        ]]
}
NZP-TransmissionComb ::=        SEQUENCE {
        transmissionComb-Freq                      TransmissionComb-Freq,
            → (2-2-10)
        transmissionComb-Time                      TransmissionComb-Time,
            → (2-2-11)
        ...
}
ZP-TransmissionComb ::= SEQUENCE {
        transmissionComb-Freq                      TransmissionComb-Freq,
            → (2-2-12)
        transmissionComb-Time                      TransmissionComb-Time,
            → (2-2-13)
        ...
}
IM-TransmissionComb ::= SEQUENCE {
        transmissionComb-Freq                      TransmissionComb-Freq,
            → (2-2-14)
        transmissionComb-Time                      TransmissionComb-Time,
            → (2-2-15)
        ...
}
TransmissionComb-Freq ::=               INTEGER    {0..X}
            → (2-2-16)
TransmissionComb-Time ::=               INTEGER    {0..Y}
            → (2-2-17)
-- ASN1STOP
```

[表 2-3]
```
-- ASN1START
CSI-RS-ConfigNZP-r11 ::=            SEQUENCE {
    csi-RS-ConfigNZPId-r11              CSI-RS-ConfigNZPId-r11,
    antennaPortsCount-r11               ENUMERATED {an1, an2, an4, an8},
    resourceConfig-r11                  INTEGER (0..31),
    subframeConfig-r11                  INTEGER (0..154),
    scramblingIdentity-r11              INTEGER (0..503),
    qcl-CRS-Info-r11                    SEQUENCE {
        qcl-ScramblingIdentity-r11          INTEGER (0..503),
        crs-PortsCount-r11                  ENUMERATED {n1, n2, n4,
spare1},
        mbsfn-SubframeConfigList-r11        CHOICE {
            release                             NULL,
            setup                               SEQUENCE {
                subframeConfigList                  MBSFN-
SubframeConfigList
            }
        }
    }
    ...,
    [[  csi-RS-ConfigNZPId-v1310            CSI-RS-ConfigNZPId-v1310
    ]]
    [[  transmissionComb-Freq               INTEGER    {0..X}      →
(2-3-00)
        transmissionComb-Time               INTEGER    {0..Y}      →
```

```
(2-3-01)
          ]]
}
CSI-RS-ConfigNZP-EMIMO-r13 ::=       CHOICE {
     release                              NULL,
     setup                                SEQUENCE {
          nzp-resourceConfigList-r13           SEQUENCE (SIZE (1..2)) OF
NZP-ResourceConfig-r13,
          cdmType-r13                          ENUMERATED {cdm2,
cdm4}
          [[   NZP-TransmissionCombList        SEQUENCE (SIZE (1..2)) OF
NZP-TransmissionComb
                    → (2-3-02)
          ]]
     }
}
NZP-ResourceConfig-r13 ::=    SEQUENCE {
     resourceConfig-r13               ResourceConfig-r13,
     ...
}
ResourceConfig-r13 ::=               INTEGER (0..31)
NZP-TransmissionComb ::=      SEQUENCE {
     transmissionComb-Freq                TransmissionComb-Freq,
          → (2-3-03)
     transmissionComb-Time                TransmissionComb-Time,
          → (2-3-04)
     ...
}
TransmissionComb-Freq ::=            INTEGER   {0..X}
          → (2-3-05)
TransmissionComb-Time ::=            INTEGER   {0..Y}
          → (2-3-06)
-- ASN1STOP
```

```
[표 2-4]
-- ASN1START
CSI-RS-ConfigZP-r11 ::=       SEQUENCE {
     csi-RS-ConfigZPId-r11            CSI-RS-ConfigZPId-r11,
     resourceConfigList-r11           BIT STRING (SIZE (16)),
     subframeConfig-r11               INTEGER (0..154),
     [[   ZP-TransmissionCombList          SEQUENCE (SIZE (1..16)) OF
ZP-TransmissionComb
                    → (2-4-00)
          ZP-TransmissionComb                  ZM-TransmissionComb
                    → (2-4-01)
     ]]
     ...
}
ZP-TransmissionComb ::= SEQUENCE {
     transmissionComb-Freq                TransmissionComb-Freq,
          → (2-4-02)
     transmissionComb-Time                TransmissionComb-Time,
          → (2-4-03)
     ...
}
TransmissionComb-Freq ::=            INTEGER   {0..X}
          → (2-4-04)
TransmissionComb-Time ::=            INTEGER   {0..Y}
          → (2-4-05)
-- ASN1STOP
```

In the above-described embodiment, the RRC parameters are defined on the assumption that comb type CSI-RS transmission is supported in the frequency and time domains, but actual application is not necessarily limited thereto. For example, it is also possible to support only subgroup configurations in the frequency domain, the subgroup shape may be defined as various other items, such as frequency domain measurement restriction. In this case, the RRC parameters can be analyzed and defined with other proper expressions.

FIG. 8 is a diagram illustrating CSI-RS resources having low overhead that may be configured to a terminal according to an embodiment of the present disclosure.

Referring to FIG. 8, it is assumed that overhead of a frequency domain is reduced, and it is possible that the respective CSI-RS ports are transmitted from one of even PRB group (or comb type A) and odd PRB group (or comb type B). Although FIG. 8 illustrates a case where 24 CSI-RS ports are transmitted for convenience, the number of CSI-RS ports is not limited thereto, but can be extended to various cases, such as 20, 28, 32, and 64.

As an example, as 800 of FIG. 8, all CSI-RS ports may be configured to be transmitted from the odd PRB group (or even PRB group). In this case, since the CSI-RS ports exist in one RB, they are strengthened in frequency/time selectivity of the channel, and have advantageous characteristics to estimation of channel direction information for PMI determination. In contrast, unlike the CSI-RSs up to Release 13, the CSI-RS ports are not transmitted for each PRB, and thus greater influence may be exerted on the existing terminals from the viewpoint of PDSCH rate matching.

As another example, as indicated as 801, 802, 803, and 804 in FIG. 8, it may be configured that partial CSI-RS ports 801 and 802 are transmitted from an odd PRB group 810, and the remaining CSI-RS ports 803 and 804 are transmitted from an even PRB group 820. In this case, since all CSI-RS ports do not exist in one RB, they may have somewhat sensitive characteristics in the frequency/time selectivity of the channel, but since the CSI-RS ports are transmitted for each PRB, the influence exerted on the existing terminals can be reduced.

Second Embodiment

Proposed second embodiment will be described with reference to FIGS. 9, 10, 11, 12, 13, 14, 15, 16, and 17.

Figure 9:
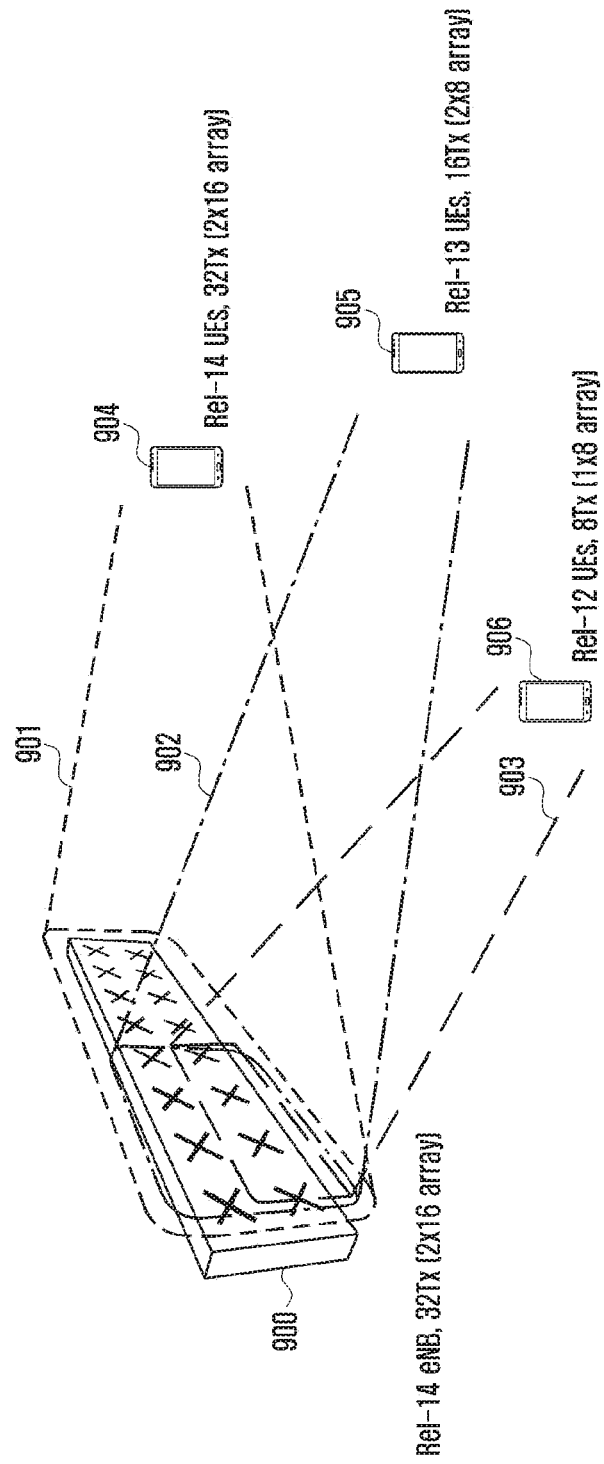
FIG. 9 is a diagram illustrating CSI-RS port sharing according to an embodiment of the present disclosure.

FIG. 9 is a diagram illustrating CSI-RS port sharing according to an embodiment of the present disclosure.

Referring to FIG. 9, as an example of enhanced FD (eFD)-MIMO or new radio (NR) MIMO base station, such as 900 of FIG. 9, a base station having an antenna structure of (n1=2, N2=8, P=2) may be assumed. Here, n1 denotes the number of antenna ports in a vertical direction of a base station antenna array, N2 denotes the number of antenna ports in a horizontal direction of the base station antenna array, and P=2 indicates that a cross-pol antenna is used. In such an environment, the total number of antenna ports becomes N1*N2*P=32. N1, N2, and P can be extended to various numbers.

Hereafter, even if a base station such as 900 of FIG. 9 is commercialized, there is a high probability that on a network, not only new terminals of release 14 or thereafter, such as 904, but also terminals of release 13 or heretofore, in which the antenna shape of 900 is unable to be recognized as 905 and 906, have still been used. If the base station intends to support the CSI-RSs of the existing terminals, such as 905 or 906, using independent resources, it uses about 3.3% of the resources in order to transmit 8-port CSI-RSs to the terminals, such as 906, up to release 12, and uses about 6.7% of the resources in order to transmit 16-port CSI-RSs to the release 13 terminals, such as 905. This indicates that the network may additionally bear maximally up to 10% of the frequency/time resources to support the existing terminals.

In order to lighten such a burden, a method in which a smaller number of CSI-RS port transmission is nested in a larger number of CSI-RS port transmission may be considered. As an example, transmission of 8-port CSI-RSs 903 of FIG. 9 may be nested as a part of transmission of 16-port CSI-RSs 902 that is larger than the transmission of 8-port CSI-RSs, and the transmission of 16-port CSI-RSs 902 may be nested as a part of transmission of 32-port CSI-RSs 901 that is larger than the transmission of 16-port CSI-RSs. This method can be efficiently used especially at the time when 5G introduction is initiated or 4G terminal is almost withdrawn.

FIG. 10 is a diagram illustrating a resource configuration for each terminal for CSI-RS port sharing according to an embodiment of the present disclosure.

Referring to FIG. 10, it is assumed that the CSI-RS RE density for a larger number of CSI-RS ports is different from the CSI RS_RE density for a small number of CSI-RS ports through application of the first embodiment as described above. As an example, a base station can receive up to 32 CSI-RS ports. 32 CSI-RS ports in total, which corresponds to 15th to 30th ports, may be configured to terminal A using four CSI-RS configurations 1010, 1020, 1030, and 1040, such as 1000 of FIG. 10. In this case, it is assumed that 8 ports configured through the first CSI-RS configuration 1010 and 8 ports configured through the second CSI-RS configuration 1020 are configured to be transmitted from an odd PRB group 1050, and 16 ports configured through the third and fourth CSI-RS configurations 1030 and 1040 are configured to be transmitted from an even PRB group 1060. The base station configures CSI-RS ports, such as 1001 of FIG. 10, to terminal B, and in this case, the base station can transmit the CSI-RSs to the terminal B that can receive up to 16 CSI-RS ports using resources, such as frequency/time resources designated by four CSI-RS configurations for the terminal A.

In an example of FIG. 10, the base station may configure so that resources designated by the first and third CSI-RS configurations 1010 and 1030 for the terminal A and comb type indicators become equal to resources designated by the first CSI-RS configuration 1010 for the terminal B. Similarly, the base station may configure so that resources designated by the second and fourth CSI-RS configurations 1020 and 1040 for the terminal A and the comb type indicators become equal to resources designated by the second CSI-RS configuration 1020 for the terminal B. Through the configuration as shown in FIG. 10, the base station enables the existing terminals to aggregate two low-overhead CSI-RS ports to recognize the same as one CSI-RS port. This example will be described with reference to FIGS. 12, 13, 14, and 15.

Figure 11:
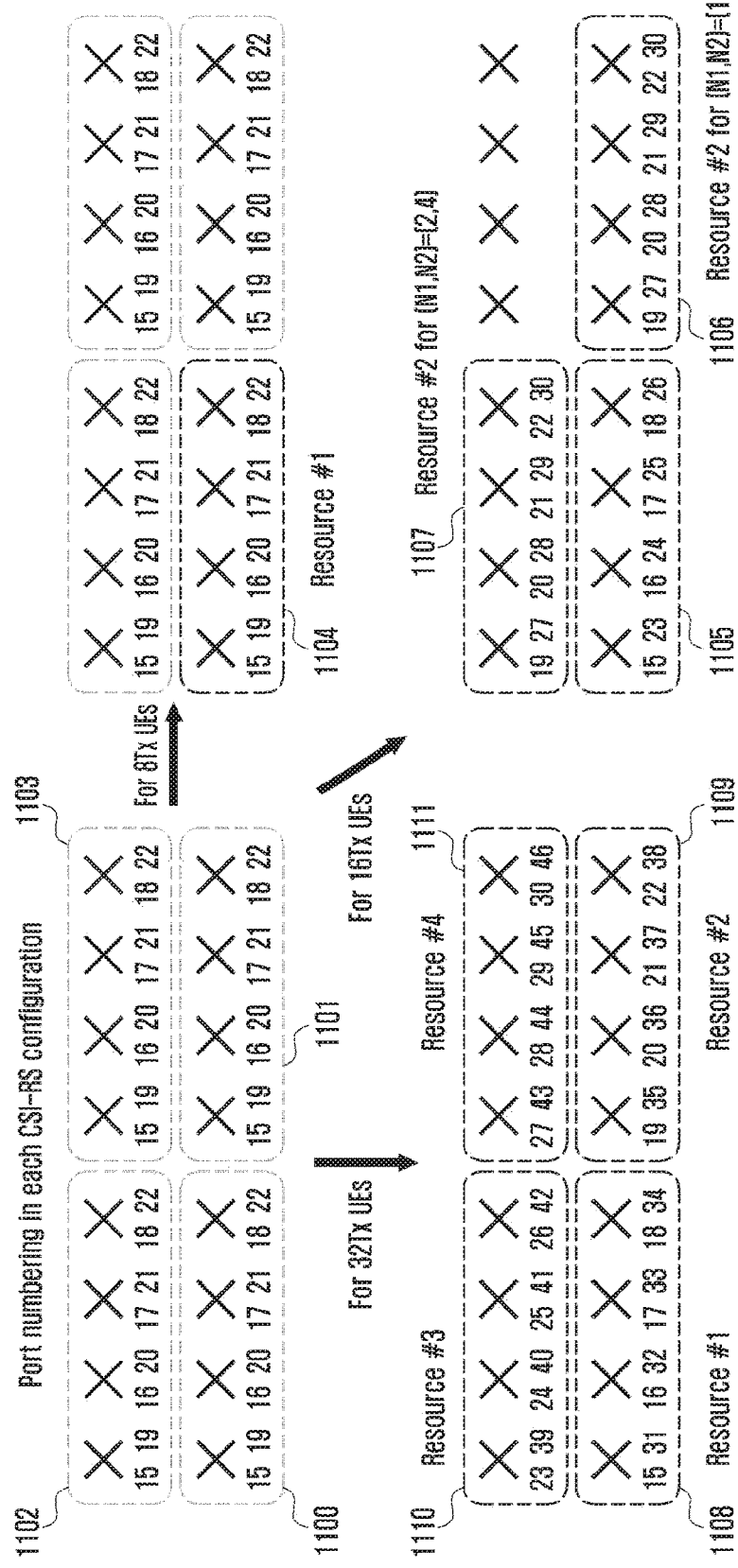
FIG. 11 is a diagram illustrating CSI-RS resource configuration for each terminal when CSI-RS is configured to a terminal after release 14 with CSI-RS RE density of one RE/RB/port according to an embodiment of the present disclosure.

FIG. 11 is a diagram illustrating a CSI-RS resource configuration for each terminal when CSI-RS is configured to a terminal after release 14 with CSI-RS RE density of one RE/RB/port according to an embodiment of the present disclosure.

Referring to FIG. 11, it is assumed that an orthogonal code CDM-2 of length 2 is configured to all terminals, and a base station has 32 antenna ports expressed as 1100, 1101, 1102, and 1103. In order to transmit CSI-RSs for 32 antenna ports, the base station may configure four component CSI-RS configurations of 1100, 1101, 1102, and 1103. In the LTE-A, a terminal up to release 12 can receive CDM-2 CSI-RS, and a release 13 terminal can receive CDM-2 and CDM-4 CSI-RSs. Accordingly, in the case of performing CSI-RS port sharing based on CDM-2, it is important to perform CSI-RS port sharing simultaneously with the release 12 and release 13 terminals.

Since the release 12 terminal receives configuration of CSI-RS resources through a single CSI-RS configuration, CSI-RS port information for cross-pol antennas should be included in one CSI-RS configuration. Accordingly, in order to perform the CSI-RS port sharing with the release 12 terminal, it is necessary that terminals of release 13 and thereafter include CSI-RS port information for the cross-pol antenna in one CSI-RS configuration.

As an example, referring to FIG. 11, the base station may allocate 8 CSI-RS ports, such as 1104, to 8 cross-pol antenna ports adjacent in a horizontal direction for terminals that can recognize maximally 8 CSI-RS ports. In consideration of 8Tx code book, the port numbers of 8 port CSI-RSs should be first increased in the horizontal direction with respect to +45°-pol (or −45°-pol) antennas, and then should be first increased in the horizontal direction with respect to −45°-pol (or +45°-pol) antennas with their polarity changed. Accordingly, it is possible to use the port number, such as the component CSI-RS configuration 1100, as the CSI-RS port number for the CSI-RS resource 1104.

Further, the base station may allocate 16 CSI-RS ports by configuring a plurality of CSI-RS configurations, such as (1105, 1106) or (1105, 1107), to 16 cross-pol antenna ports adjacent in the horizontal or vertical direction for terminals that can recognize maximally 16 CSI-RS ports. Here, (1105, 1106) are to configure 16-port CSI-RSs having an array shape of (N1=1, N2=8, P=2), and (1105, 1107) are to configure 16-port CSI-RSs having an array shape of (N1=2, N2=4, P=2). In the case of the configuration, such as (1105, 1106), the terminal is unable to obtain channel information in the vertical direction, but it can obtain channel information in more accurate horizontal direction, whereas in the case of the configuration, such as (1105, 1107), the terminal can obtain channel information in both vertical and horizontal directions.

In order to perform port sharing with 8-port CSI-RS, the CSI-RS ports of 1105 in FIG. 11 should be transmitted to the same antenna ports as those of the CSI-RS ports of 1104. Accordingly, both the antenna components (+45°-pol & −45°-pol) having two kinds of polarities should be included even in the CSI-RS configuration 1105, and for this, a port numbering rule as expressed in Mathematical expression 1 may be used.

Mathematical expression 1

$$p = \begin{cases} p' + \frac{N_{ports}^{CSI}}{2} i & \text{for } p' \in \{15, \ldots, 15 + N_{ports}^{CSI}/2 - 1\} \\ p' + \frac{N_{ports}^{CSI}}{2}(i + N_{res}^{CSI} - 1) & \text{for } p' \in \{15 + N_{ports}^{CSI}/2, \ldots, 15 + N_{ports}^{CSI} - 1\} \end{cases}$$

In Mathematical expression 1 above, p denotes an aggregated CSI-RS port index, and p' denotes a port index in each component CSI-RS configuration. Further, $N_{ports}^{CSI}$ denotes the number of ports included in each component CSI-RS configuration, $N_{res}^{CSI}$ denotes the total number of component CSI-RS configurations used in CSI-RS aggregation, and $i \in \{0, 1, \ldots, N_{res}^{CSI}-1\}$ indicates an index of the component CSI-RS configuration.

Referring to an example of FIG. 11, the relationship as expressed in Mathematical expression 1 exists between the antenna port p of the terminal that can recognize 16 CSI-RS ports and the antenna port p' (i.e., port index in the component CSI-RS) of the terminal that can recognize 16 CSI-RS ports. As an example, it is assumed that CSI-RS configurations, such as 1105 and 1106, are configured so that $N_{ports}^{CSI}$ is 8 and $N_{res}^{CSI}$ is 2 with respect to the terminal that can recognize 16 CSI-RS ports, and in the case of 1105, i=0, whereas in the case of 1106, i=1. In this case, if the antenna port of the CSI-RS configuration 1104 that a 8-port terminal recognizes is p, the antenna port numbers of 1105 and 1106 are determined as {15, 16, 17, 18, 23, 24, 25, 26} in the case of 1105, and are determined as {19, 20, 21, 22, 27, 28, 29, 30} in the case of 1106 in accordance with Mathematical expression 1.

Referring to Mathematical expression 1, in order to include all antenna components of two kinds of polarities in one component CSI-RS configuration, the component CSI-RS configuration is decomposed into two subgroups to perform port numbering. For example, Mathematical expression 1 may be understood as a function for cross-pol.

In an example of FIG. 11, it is possible to proceed with a 32-port CSI-RS configuration method for CSI-RS port sharing through extension of the above explanation. The base station may configure 4 CSI-RS configurations each including 8 CSI-RS ports, such as 1108, 1109, 1110, and 1111 of FIG. 11, for terminals that can recognize 32 CSI-RS ports in all. In this case, the base station performs port numbering based on Mathematical expression 1 for port sharing with 8-port and 16-port CSI-RSs.

Figure 12:
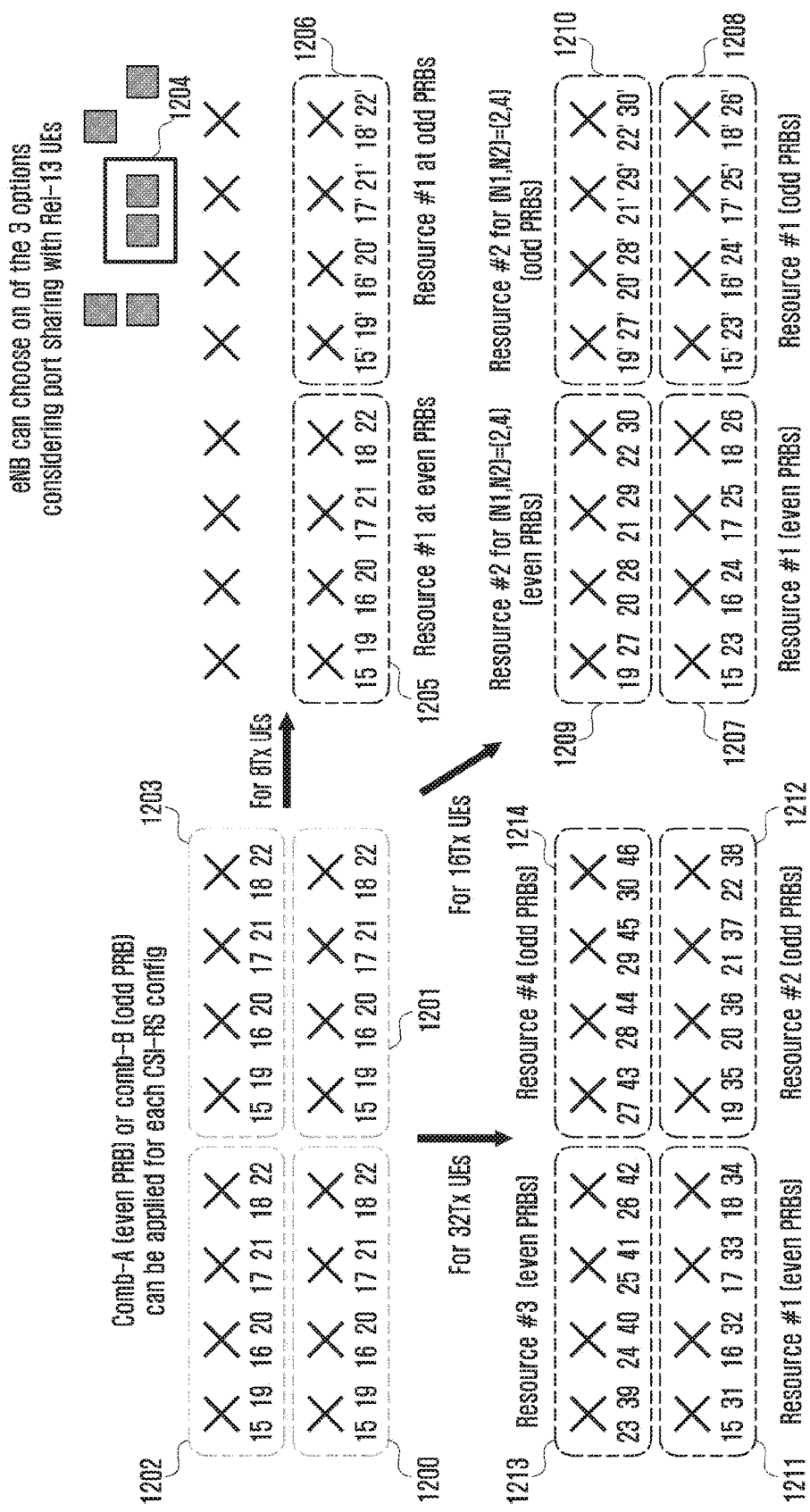
FIG. 12 is a diagram illustrating CSI-RS resource configuration and port numbering if CSI-RS RE density for a larger number of CSI-RS ports is different from CSI-RS RE density for a small number of CSI-RS ports according to an embodiment of the present disclosure.

FIG. 12 is a diagram illustrating CSI-RS resource configuration and port numbering if CSI-RS RE density for a larger number of CSI-RS ports is different from CSI-RS RE density for a small number of CSI-RS ports in a similar manner as described above with reference to FIG. 10 according to an embodiment of the present disclosure.

Referring to FIG. 12, respective component CSI-RS configurations 1200, 1201, 1202, and 1203 are not transmitted from each PRB or each CSI-RS subframe, but can be transmitted from a partial PRB group or a partial CSI-RS subframe group in accordance with a configured comb type.

FIG. 12 illustrates an example in which respective component CSI-RS configurations are transmitted from an even PRB or an odd PRB in accordance with the comb type configuration.

It is assumed that a base station having an antenna array shape of (N1=2, N2=8, P=2) has configured 4 CSI-RS configurations each including 8 CSI-RS ports, such as 1211, 1212, 1213, or 1214 of FIG. 12, for terminals that can recognize 32 CSI-RS ports in all. In this case, it is configured that the first and third CSI-RS configurations 1211 and 1213 are transmitted from an even PRB, and the second and fourth CSI-RS configurations 1212 and 1214 are transmitted from an odd PRB. On the other hand, since the existing terminals that can recognize maximally up to 8 or 16 ports are unable to receive (or understand) the CSI-RS ports transmitted from a partial PRB group, the base station can perform CSI-RS port sharing with the existing terminal through aggregation or virtualization of the CSI-RS ports transmitted from the even PRB and CSI-RS ports transmitted from the odd PRB. It can be understood that CSI-RS virtualization is performed through decomposition of a base station array, such as 1204 of FIG. 12, into subgroups in the horizontal direction, in the configuration like this example.

Figure 13:
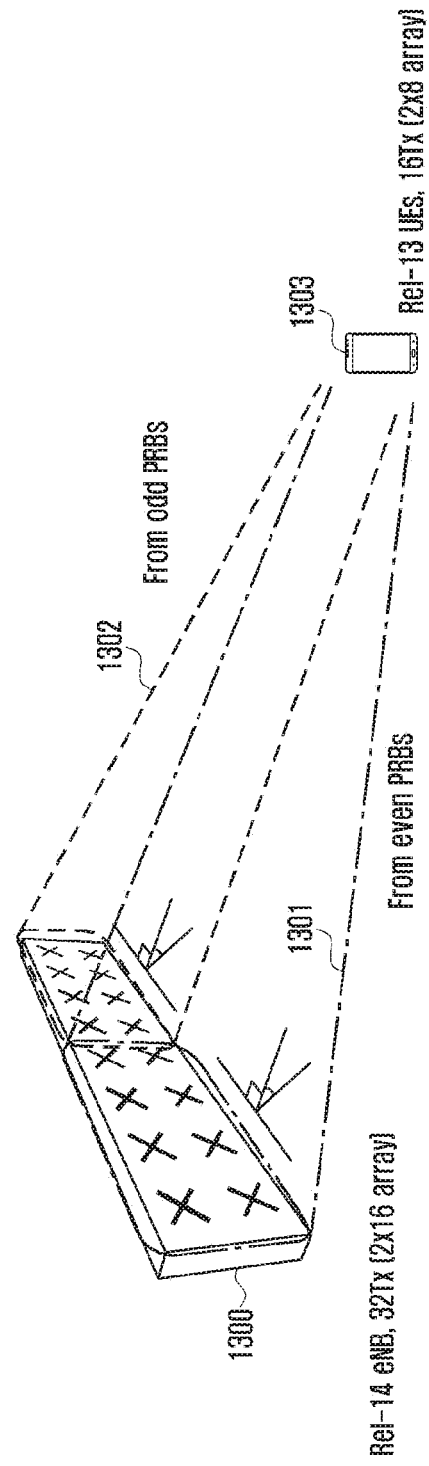
FIG. 13 is a diagram illustrating a base station array being decomposed into subgroups in a horizontal direction and CSI-RS virtualization is performed with respect to the decomposed subgroups according to an embodiment of the present disclosure.

FIG. 13 is a diagram illustrating a base station array being decomposed into subgroups in a horizontal direction and CSI-RS virtualization is performed with respect to the decomposed subgroups according to an embodiment of the present disclosure.

Referring to FIG. 13, a base station 1300 may decompose its own array into two kinds of horizontal-direction subgroups 1301 and 1302, and may transmit the same to an existing terminal 1303 that is unable to entirely understand the antenna array shape of the base station through different frequency/time comb types.

Referring to FIG. 13, respective component CSI-RSs are transmitted from an odd PRB or an even PRB in accordance with comb type configuration.

For example, the base station can use 16 cross-pol antenna ports that are adjacent in a horizontal direction, such as 1205 and 1206, for terminals that can recognize maximally 8 CSI-RS ports. In this case, the terminal that can recognize the maximally 8 CSI-RS ports may recognize CSI-RS ports transmitted for each even PRB from 1205 and CSI-RS ports transmitted for each odd PRB from 1206 as one 8-port CSI-RS configuration. For this, the base station has CSI-RS configurations such as 1205 and 1206 (i.e., it indicates that the base station uses the same CSI-RS pattern in one RB), but configures to have different comb types. Through this, {19, 20, 21, 22, 35, 36, 37, 38} numbered CSI-RS ports of 1212 can be recognized as {15, 16, 17, 18, 19, 20, 21, 22} numbered CSI-RS ports of 1206 through the terminal that receives the 8-port CSI-RSs.

The base station may extend the method for CSI-RS port sharing with the terminals that can recognize maximally 16 CSI-RS ports. In this example, the base station performs CSI-RS virtualization through decomposition of the whole array in a horizontal direction, and thus can use a vertical-direction array component for the terminals that receive the 16-port CSI-RSs. Specifically, CSI-RS ports transmitted from 1207 and 1208 are tied into one to configure the first component CSI-RS configuration, and CSI-RS ports transmitted from 1209 and 1210 are tied into one to configure the second component CSI-RS configuration. Through this, the base station may provide CSI-RS ports for (N1=2, N2=4, P=2) antenna array shape to the terminal that can receive maximally 16 CSI-RSs.

Figure 14:
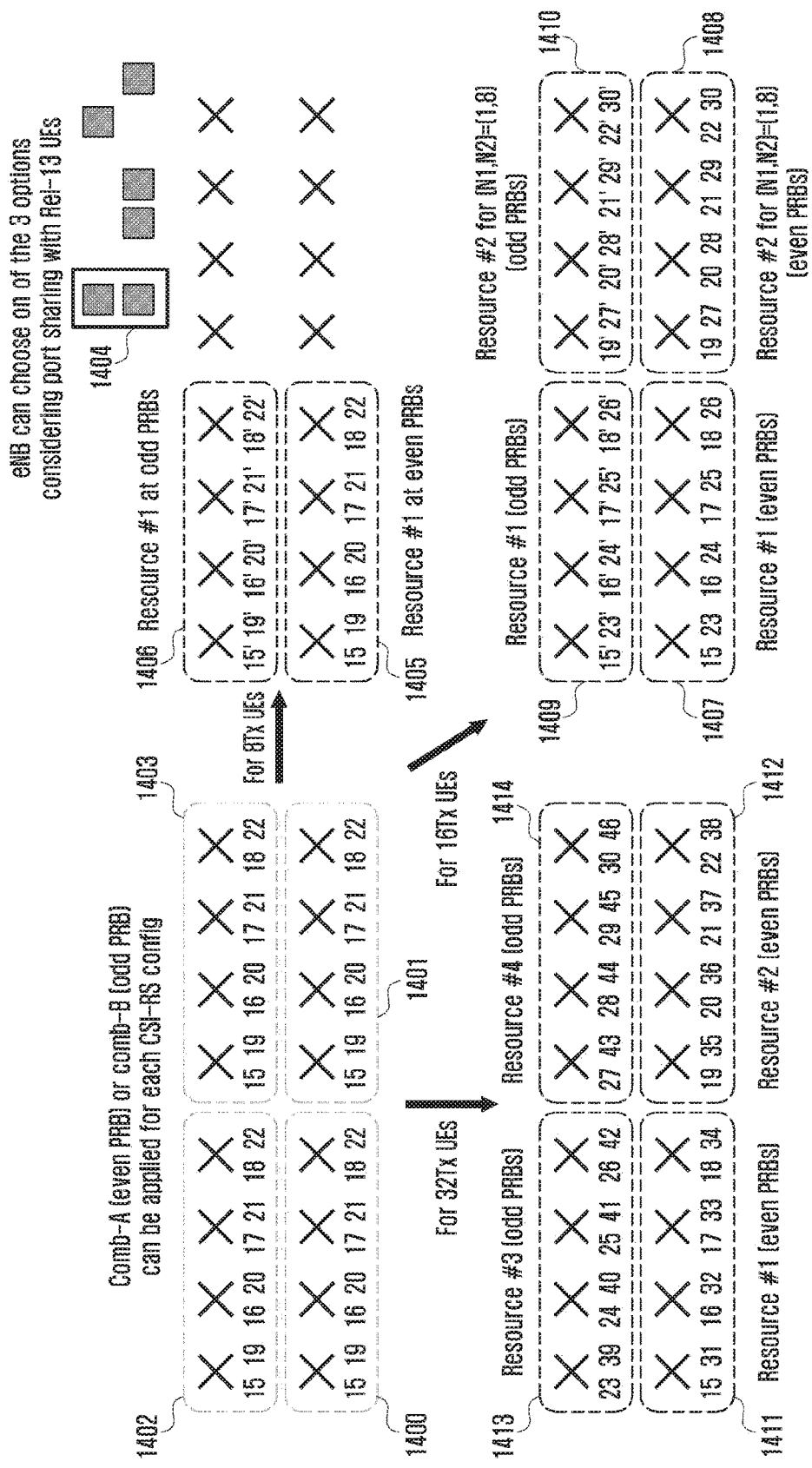
FIG. 14 is a diagram illustrating CSI-RS resource configuration and port numbering if CSI-RS RE density for a larger number of CSI-RS ports is different from CSI-RS RE density for a small number of CSI-RS ports according to an embodiment of the present disclosure.

FIG. 14 is a diagram illustrating CSI-RS resource configuration and port numbering if CSI-RS RE density for a larger number of CSI-RS ports is different from CSI-RS RE density for a small number of CSI-RS ports in a similar manner to that as described above with reference to FIG. 10 according to an embodiment of the present disclosure.

Referring to FIG. 14, respective component CSI-RS configurations 1400, 1401, 1402, and 1403 are not transmitted from each PRB or each CSI-RS subframe, but can be transmitted from a partial PRB group or a partial CSI-RS subframe group in accordance with a configured comb type. FIG. 14 illustrates an example in which respective component CSI-RS configurations are transmitted from an even PRB or an odd PRB in accordance with the comb type configuration.

It is assumed that a base station having an antenna array shape of (N1=2, N2=8, P=2) has configured 4 CSI-RS configurations each including 8 CSI-RS ports, such as 1411, 1412, 1413, or 1414 of FIG. 14, for terminals that can recognize 32 CSI-RS ports in all. In this case, it is configured that the first and second CSI-RS configurations 1411 and 1412 are transmitted from an even PRB, and the third and fourth CSI-RS configurations 1413 and 1414 are transmitted from an odd PRB. On the other hand, since the existing terminals that can recognize maximally up to 8 or 16 ports are unable to receive (or understand) the CSI-RS ports transmitted from a partial PRB group, the base station can perform CSI-RS port sharing with the existing terminal through aggregation or virtualization of the CSI-RS ports transmitted from the even PRB and CSI-RSs transmitted from the odd PRB. It can be understood that CSI-RS virtualization is performed through decomposition of a base station array, such as 1404 of FIG. 14, into subgroups in the horizontal direction, in the configuration like this example.

Figure 15:
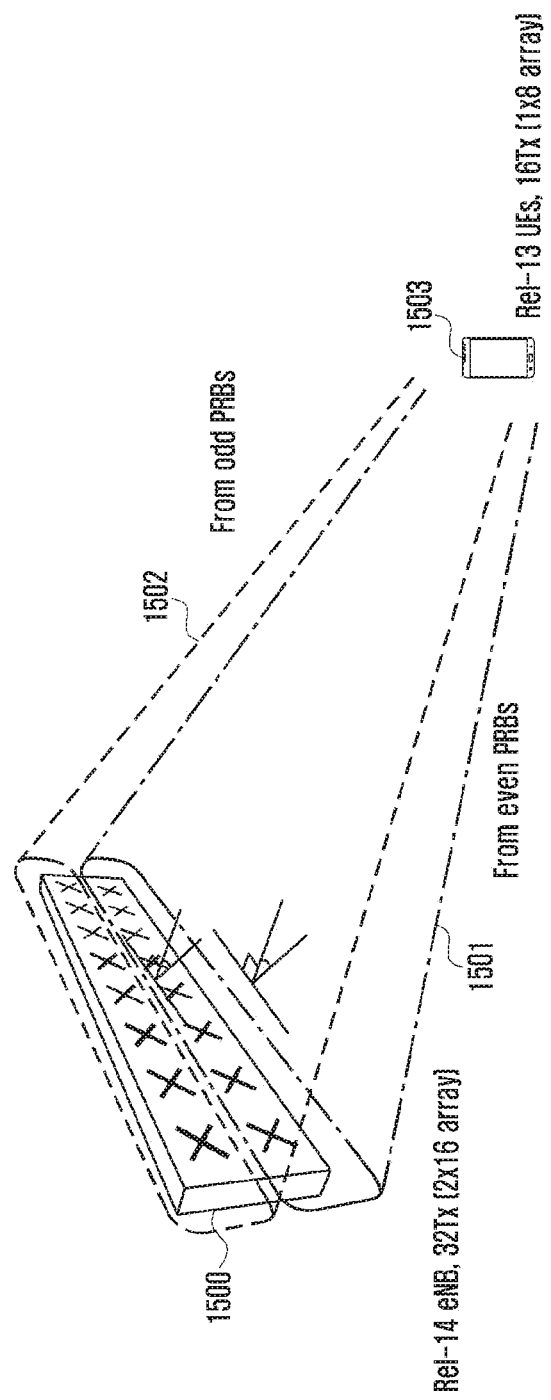
FIG. 15 is a diagram illustrating a base station array being decomposed into subgroups in a vertical direction and CSI-RS virtualization is performed with respect to the decomposed subgroups according to an embodiment of the present disclosure.

FIG. 15 is a diagram illustrating a base station array being decomposed into subgroups in a vertical direction and CSI-RS virtualization is performed with respect to the decomposed subgroups according to an embodiment of the present disclosure.

Referring to FIG. 15, a base station 1500 may decompose its own array into two kinds of vertical-direction subgroups 1501 and 1502, and may transmit the same to an existing terminal 1503 that is unable to entirely understand the antenna array shape of the base station through different frequency/time comb types. Referring to FIG. 15, respective component CSI-RSs are transmitted from an odd PRB or an even PRB in accordance with comb type configuration.

For example, the base station can use 16 cross-pol antenna ports that are adjacent in horizontal and vertical directions, such as 1405 and 1406, for terminals that can recognize maximally 8 CSI-RS ports. In this case, the terminal that can recognize the maximally 8 CSI-RS ports may recognize CSI-RS ports transmitted for each even PRB from 1405 and CSI-RS ports transmitted for each odd PRB from 1406 as one 8-port CSI-RS configuration. For this, the base station has CSI-RS configurations such as 1405 and 1406 (i.e., it indicates that the base station uses the same CSI-RS pattern in one RB), but configures to have different comb types. Through this, {23, 24, 25, 26, 39, 40, 41, 42} numbered CSI-RS ports of 1413 can be recognized as {15, 16, 17, 18, 19, 20, 21, 22} numbered CSI-RS ports of 1406 through the terminal that receives the 8-port CSI-RSs.

The base station may extend the method for CSI-RS port sharing with the terminals that can recognize maximally 16 CSI-RS ports. In this example, the base station performs CSI-RS virtualization through decomposition of the whole array in a vertical direction, and thus can use a vertical-direction array component for the terminals that receive the 16-port CSI-RSs. Specifically, CSI-RS ports transmitted from 1407 and 1408 are tied into one to configure the first component CSI-RS configuration, and CSI-RS ports transmitted from 1409 and 1410 are tied into one to configure the second component CSI-RS configuration. Through this, the base station may provide CSI-RS ports for (N1=1, N2=8, P=2) antenna array shape to the terminal that can receive maximally 16 CSI-RSs.

Figure 16:
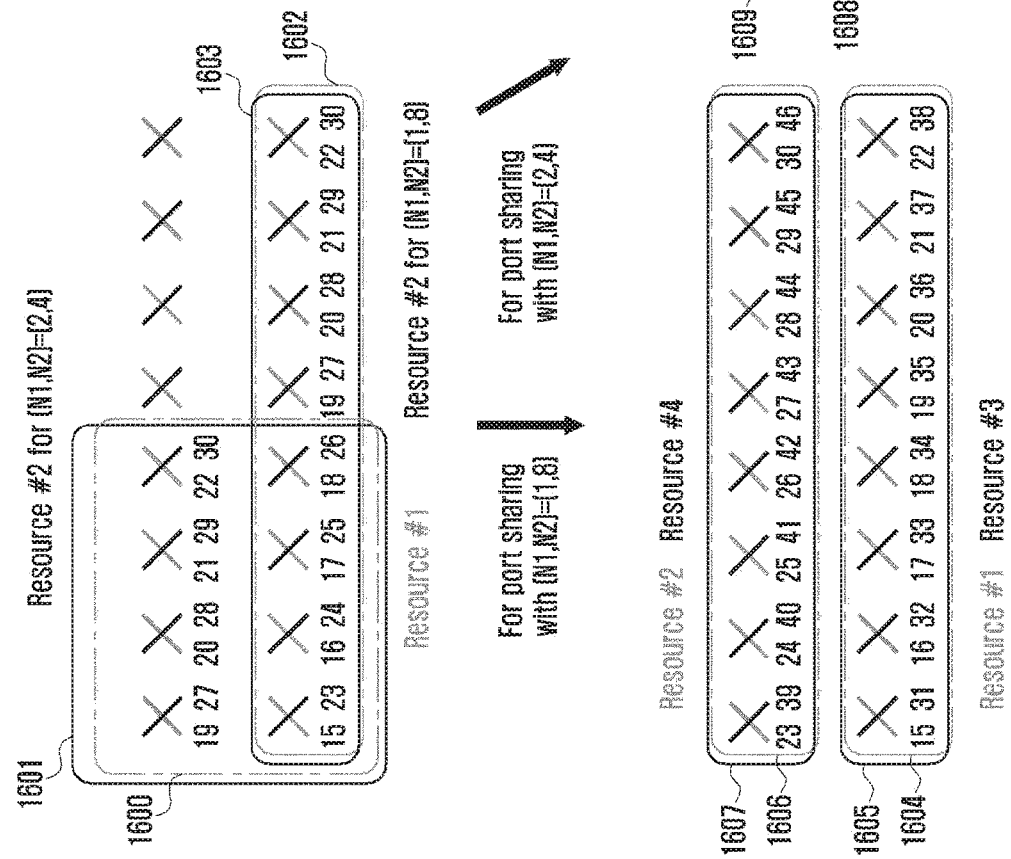
FIGS. 16 and 17 are diagrams illustrating port sharing between CSI-RSs using an orthogonal cover code of length 4 (CDM-4) according to an embodiment of the present disclosure.
Figure 17:
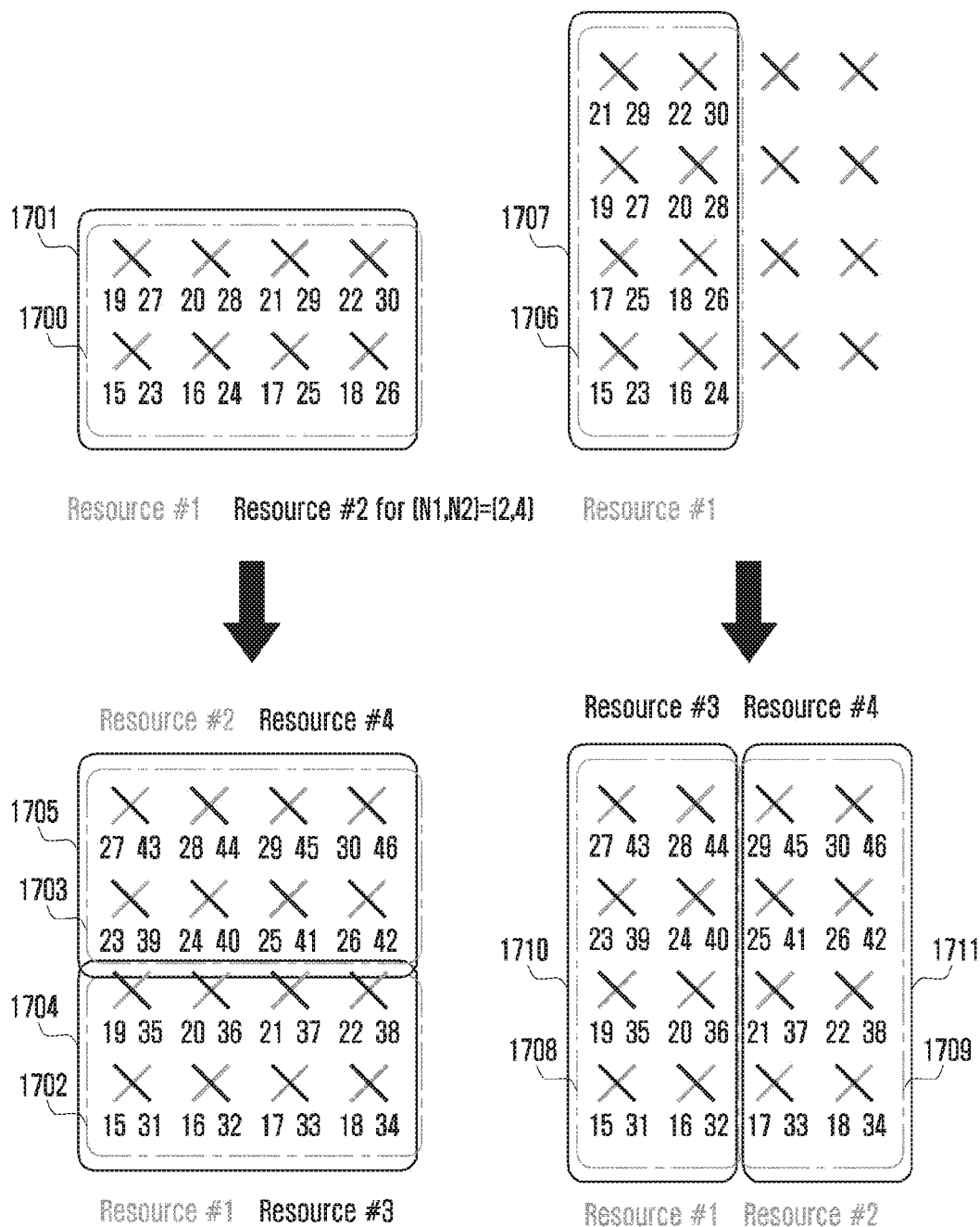

FIGS. 16 and 17 are diagrams illustrating port sharing between CSI-RSs using an orthogonal cover code CDM-4 of length 4. CDM-4 based CSI-RS is supported only to a terminal after release 13, and 12 or 16-port CSI-RSs can be configured according to various embodiments of the present disclosure.

Referring to FIGS. 16 and 17, during designing of CDM-4 based CSI-RS port sharing, it is not necessary to consider a CSI-RS pattern up to 8 ports, but it is necessary to design a CSI-RS aggregation method over 20 ports and a port numbering method based on a 16-port CSI-RS pattern. On the other hand, CSI-RS ports of the 12 or 16-port CSI-RS are indexed in accordance with the port numbering method as expressed in Mathematical expression 2 below.

$$p = iN_{ports}^{CSI} + p' \qquad \text{Mathematical expression 2}$$

In Mathematical expression 2 above, respective variables are the same as those in Mathematical expression 1. Mathematical expression 2 indicates that during 16-port CSI-RS aggregation, individual CSI-RS port indexes of respective CSI-RS configurations are successively increased in the order of component CSI-RS configuration indexes. On the other hand, in consideration of 12Tx and 16Tx code book of release 13, the port numbers of 12 or 16-port CSI-RSs are first increased in the horizontal direction with respect to +45°-pol (or −45°-pol) antennas, and then are increased in the vertical direction. Thereafter, with respect to −45°-pol (or +45°-pol) antennas with their polarity changed, the port numbers are first increased in the horizontal direction, and then are increased in the vertical direction. The two facts as described above mean that during configuration of the 16-port CSI-RSs based on CDM-4, only one-polarity antenna component can exist for one component CSI-RS configuration. This suggests that new port numbering that is expressed as a function of "antenna array shape and cross-pol" is necessary, unlike the CDM-2 based port numbering that is expressed as a function of "cross-pol" for the CDM-4 based CSI-RS port sharing.

Referring to FIG. 16, the base station having the antenna array shape of (N1=1, N2=8, P=2) (32 antenna ports in total) may configure the CDM-4 based 16-port CSI-RSs through aggregation of a plurality of component CSI-RS configurations. The base station may recognize 16-port antenna arrays having different structures through different aggregation of the component CSI-RS configurations. As an example, the base station may configure 1600 and 1601 of FIG. 16 as the first and second component CSI-RS configurations, and may transmit 16-port CSI-RSs based on the antenna array shape of (N1=1, N2=8, P=2).

Referring to FIG. 16, if the base station intends to support (N1=1, N2=8, P=2) based 16-port CSI-RSs through component CSI-RS configurations of 1602 and 1603, it may extend to 1604, 1605, and 1606 to transmit 32-port CSI-RSs, and may perform port sharing. In this case, according to the port numbering of 1604, 1605, 1606, and 1607, it can be seen that the CSI-RS port numbers are successively increased in accordance with the indexes of the component CSI-RS configurations. Accordingly, in this case, it is possible to apply the port numbering method of Mathematical expression 2 as it is. This is possible because one component CSI-RS configuration wholly includes horizontal-direction antenna ports.

As another example, if the base station intends to support (N1=2, N2=4, P=2) based 16-port CSI-RSs through component CSI-RSs of 1600 and 1601, it may extend to 1608

1609, 1610, and 1611 to transmit 32-port CSI-RSs, and may perform port sharing. In this case, according to the port numbering of 1608, 1609, 1610, and 1611, it can be seen that the CSI-RS port numbers are not successively increased in accordance with the indexes of the component CSI-RS configurations. This is because one component CSI-RS configuration cannot wholly include horizontal-direction antenna ports. Accordingly, in this case, it is not possible to apply the port numbering method of Mathematical expression 2 as it is. For example, in order to perform the CDM-4 based CSI-RS port sharing, it is necessary to correct the port numbering method into a function of not only a cross-pol array structure but also a 2D array shape, that is, a function of N1 or N2.

As described above, in one aggregated CSI-RS resource, a first half of CSI-RS ports correspond to antenna ports having the polarity of +45°-pol (or −45°-pol), and the remaining half of CSI-RS ports correspond to antenna ports having the polarity of −45°-pol (or +45°-pol). Accordingly, Mathematical expression 3 enables port numbering to be performed according to the cross-pol polarity in accordance with the component CSI-RS index condition $i<N_{res}^{CSI}/2$ and $i \geq N_{res}^{CSI}/2$. In addition, since one component CSI-RS configuration can include a part of first and second (or vertical and horizontal)-direction CSI-RS ports, it is necessary to additionally consider the number of times $N_{ports}^{CSI}/N_1^{Config}$ discontinuous port numbering occurs in one component Mathematical expression 3

$$p = \begin{cases} p' + \dfrac{N_{ports}^{CSI}}{N_1^{Config}} i & \text{for } p' \in \left\{15, \ldots, 15 + \dfrac{N_{ports}^{CSI}}{N_1^{Config}} - 1\right\} \text{ and } i < N_{res}^{CSI}/2 \\[6pt] p' + \dfrac{N_{ports}^{CSI}}{N_1^{Config}} i + N_2 - N_2^{Config} & \text{for } p' \in \left\{15 + \dfrac{N_{ports}^{CSI}}{N_1^{Config}}, \ldots, 15 + \dfrac{2N_{ports}^{CSI}}{N_1^{Config}} - 1\right\} \text{ and } i < N_{res}^{CSI}/2 \\[6pt] p' + \dfrac{N_{ports}^{CSI}}{N_1^{Config}} i + 2(N_2 - N_2^{Config}) & \text{for } p' \in \left\{15 + \dfrac{2N_{ports}^{CSI}}{N_1^{Config}}, \ldots, 15 + \dfrac{3N_{ports}^{CSI}}{N_1^{Config}} - 1\right\} \text{ and } i < N_{res}^{CSI}/2 \\[6pt] p' + \dfrac{N_{ports}^{CSI}}{N_1^{Config}} i + 3(N_2 - N_2^{Config}) & \text{for } p' \in \left\{15 + \dfrac{3N_{ports}^{CSI}}{N_1^{Config}}, \ldots, 15 + N_{ports}^{CSI} - 1\right\} \text{ and } i < N_{res}^{CSI}/2 \\[6pt] p' + \dfrac{N_{ports}^{CSI}}{N_1^{Config}}(i + N_{res}^{CSI}/2) & \text{for } p' \in \left\{15, \ldots, 15 + \dfrac{N_{ports}^{CSI}}{N_1^{Config}} - 1\right\} \text{ and } i \geq N_{res}^{CSI}/2 \\[6pt] p' + \dfrac{N_{ports}^{CSI}}{N_1^{Config}}(i + N_{res}^{CSI}/2) + (N_2 - N_2^{Config}) & \text{for } p' \in \left\{15 + \dfrac{N_{ports}^{CSI}}{N_1^{Config}}, \ldots, 15 + \dfrac{2N_{ports}^{CSI}}{N_1^{Config}} - 1\right\} \text{ and } i \geq N_{res}^{CSI}/2 \\[6pt] p' + \dfrac{N_{ports}^{CSI}}{N_1^{Config}}(i + N_{res}^{CSI}/2) + 2(N_2 - N_2^{Config}) & \text{for } p' \in \left\{15 + \dfrac{2N_{ports}^{CSI}}{N_1^{Config}}, \ldots, 15 + \dfrac{3N_{ports}^{CSI}}{N_1^{Config}} - 1\right\} \text{ and } i \geq N_{res}^{CSI}/2 \\[6pt] p' + \dfrac{N_{ports}^{CSI}}{N_1^{Config}}(i + N_{res}^{CSI}/2) + 3(N_2 - N_2^{Config}) & \text{for } p' \in \left\{15 + \dfrac{3N_{ports}^{CSI}}{N_1^{Config}}, \ldots, 15 + N_{ports}^{CSI} - 1\right\} \text{ and } i \geq N_{res}^{CSI}/2 \end{cases}$$

Mathematical expression 3 above refers to a CSI-RS port numbering method of a new terminal that is extended for the CDM-4 based CSI-RS port sharing. In Mathematical expression 3, p, p', $N_{ports}^{CSI}$, $N_{res}^{CSI}$, and i are used as the same meanings as those in Mathematical expression 1. $N_1$ denotes the number of CSI-RS ports (or antenna ports) in the first direction (vertical direction), and $N_1^{Config}$ denotes the number of CSI-RS ports (or antenna ports) in the first direction (vertical direction) included in one component CSI-RS configuration ($N_1^{Config}$ may be the number of CSI-RS ports (or antenna ports) in the first direction (or vertical direction) to be recognized by a terminal in the related art that will perform the port sharing). $N_2$ denotes the number of CSI-RS ports (or antenna ports) in the second direction (horizontal direction), and $N_2^{Config}$ denotes the number of CSI-RS ports (or antenna ports) in the second direction (or horizontal direction) included in one component CSI-RS configuration (or may be the number of CSI-RS ports (or antenna ports) in the second direction (or horizontal direction) to be recognized by a terminal in the related art that will perform the port sharing). $N_1^{Config}$ and $N_2^{Config}$ can be configured in a dynamic or semi-static manner by physical layer signaling or higher layer signaling, and also can be configured in an implicit manner by a method for determining a specific figure or for selecting a mathematical expression.

CSI-RS configuration and the size of port index ($N_2 - N_2^{Config}$) to be increased during the discontinuous port numbering.

Detailed examples of the above explanation according to the base station antenna array shape will be described. If the base station configures 1600 and 1601 as first and second component CSI-RS configurations, and configures 16-port CSI-RS based on the antenna array shape of (N1=2, N2=4, P=2), the corresponding base station configures 1608, 1609, 1610, and 1611 as the first, third, second, and fourth component CSI-RS configurations, respectively, and performs signaling with respect to a terminal that can recognize the antenna array shape of (N1=2, N2=8, P=2). This order is to maintain the aggregated CSI-RS port numbering order in the 2D cross-pol antenna array as described above.

In this example, each component CSI_RS configuration includes 8 CSI-RS ports $N_{ports}^{CSI}=8$. Since the number of first-direction (or vertical direction) antenna ports included in one component CSI-RS configuration is 2 ($N_1^{Config}=2$), the number of second-direction (or horizontal direction) antenna ports is $N_2=8$, and the number of second-direction (or horizontal direction) antenna ports included in one component CSI-RS configuration is $N_2^{Config}=4$, Mathematical expression 3 as described above may be managed as Mathematical expression 4 below.

$$p = \begin{cases} p' + \dfrac{N_{ports}^{CSI}}{N_1^{Config}} i & \text{for } p' \in \left\{15, \ldots, 15 + \dfrac{N_{ports}^{CSI}}{N_1^{Config}} - 1\right\} \text{ and } i < N_{res}^{CSI}/2 \\ p' + \dfrac{N_{ports}^{CSI}}{N_1^{Config}} i + N_2 - N_2^{Config} & \text{for } p' \in \left\{15 + \dfrac{N_{ports}^{CSI}}{N_1^{Config}}, \ldots, 15 + N_{ports}^{CSI} - 1\right\} \text{ and } i < N_{res}^{CSI}/2 \\ p' + \dfrac{N_{ports}^{CSI}}{N_1^{Config}} (i + N_{res}^{CSI}/2) & \text{for } p' \in \left\{15, \ldots, 15 + \dfrac{N_{ports}^{CSI}}{N_1^{Config}} - 1\right\} \text{ and } i \geq N_{res}^{CSI}/2 \\ p' + \dfrac{N_{ports}^{CSI}}{N_1^{Config}} (i + N_{res}^{CSI}/2) + N_2 - N_2^{Config} & \text{for } p' \in \left\{15 + \dfrac{N_{ports}^{CSI}}{N_1^{Config}}, \ldots, 15 + N_{ports}^{CSI} - 1\right\} \text{ and } i \geq N_{res}^{CSI}/2 \end{cases}$$

Mathematical expression 4

According to Mathematical expression 4 above, in the case of i=0, 1608 includes the numbers of antenna ports {15, 16, 17, 18, 23, 24, 25, 26}, and in the case of i=1, 1610 includes the numbers of antenna ports {19, 20, 21, 22, 27, 28, 29, 30}. Further, in the case of i=2, 1609 includes the numbers of antenna ports {31, 32, 33, 34, 39, 40, 41, 42}, and in the case of i=4, 1610 includes the numbers of antenna ports {35, 36, 37, 38, 43, 44, 45, 46}.

As another example, a case where a base station has (N1=4, N2=4, P=2) antenna array shape as shown in FIG. 17 will be described. In an environment as shown in FIG. 17, the base station may use two methods in order to configure CDM-4 based 16-port CSI-RSs.

The first method is to configure 16-port CSI-RSs through component CSI-RS configurations of 1700 and 1701. In this case, the base station may extend to 1702, 1703, 1704, and 1705, transmit 32-port CSI-RSs, and perform port sharing.

CSI-RS port numbers are not successively increased in accordance with the indexes of the component CSI-RS configurations. This is because one component CSI-RS configuration cannot wholly include horizontal-direction antenna ports. Accordingly, in this case, it is not possible to apply the port numbering method of Mathematical expression 2 as it is.

In this example, each component CSI_RS configuration includes 8 CSI-RS ports $N_{ports}^{CSI}=8$. Since the number of first-direction (or vertical direction) antenna ports included in one component CSI-RS configuration is 4 ($N_1^{Config}=4$), the number of second-direction (or horizontal direction) antenna ports is $N_2=4$, the number of second-direction (or horizontal direction) antenna ports included in one component CSI-RS configuration is $N_2^{Config}=2$, and $N_{res}^{CSI}=4$, Mathematical expression 3 as described above may be managed as Mathematical expression 5 below.

$$p = \begin{cases} p' + \dfrac{N_{ports}^{CSI}}{N_1^{Config}} i & \text{for } p' \in \left\{15, \ldots, 15 + \dfrac{N_{ports}^{CSI}}{N_1^{Config}} - 1\right\} \text{ and } i < N_{res}^{CSI}/2 \\ p' + \dfrac{N_{ports}^{CSI}}{N_1^{Config}} i + N_2 - N_2^{Config} & \text{for } p' \in \left\{15 + \dfrac{N_{ports}^{CSI}}{N_1^{Config}}, \ldots, 15 + \dfrac{2N_{ports}^{CSI}}{N_1^{Config}} - 1\right\} \text{ and } i < N_{res}^{CSI}/2 \\ p' + \dfrac{N_{ports}^{CSI}}{N_1^{Config}} i + 2(N_2 - N_2^{Config}) & \text{for } p' \in \left\{15 + \dfrac{2N_{ports}^{CSI}}{N_1^{Config}}, \ldots, 15 + \dfrac{3N_{ports}^{CSI}}{N_1^{Config}} - 1\right\} \text{ and } i < N_{res}^{CSI}/2 \\ p' + \dfrac{N_{ports}^{CSI}}{N_1^{Config}} i + 3(N_2 - N_2^{Config}) & \text{for } p' \in \left\{15 + \dfrac{3N_{ports}^{CSI}}{N_1^{Config}}, \ldots, 15 + N_{ports}^{CSI} - 1\right\} \text{ and } i < N_{res}^{CSI}/2 \\ p' + \dfrac{N_{ports}^{CSI}}{N_1^{Config}} (i + N_{res}^{CSI}/2) & \text{for } p' \in \left\{15, \ldots, 15 + \dfrac{N_{ports}^{CSI}}{N_1^{Config}} - 1\right\} \text{ and } i \geq N_{res}^{CSI}/2 \\ p' + \dfrac{N_{ports}^{CSI}}{N_1^{Config}} (i + N_{res}^{CSI}/2) + (N_2 - N_2^{Config}) & \text{for } p' \in \left\{15 + \dfrac{N_{ports}^{CSI}}{N_1^{Config}}, \ldots, 15 + \dfrac{2N_{ports}^{CSI}}{N_1^{Config}} - 1\right\} \text{ and } i \geq N_{res}^{CSI}/2 \\ p' + \dfrac{N_{ports}^{CSI}}{N_1^{Config}} (i + N_{res}^{CSI}/2) + 2(N_2 - N_2^{Config}) & \text{for } p' \in \left\{15 + \dfrac{2N_{ports}^{CSI}}{N_1^{Config}}, \ldots, 15 + \dfrac{3N_{ports}^{CSI}}{N_1^{Config}} - 1\right\} \text{ and } i \geq N_{res}^{CSI}/2 \\ p' + \dfrac{N_{ports}^{CSI}}{N_1^{Config}} (i + N_{res}^{CSI}/2) + 3(N_2 - N_2^{Config}) & \text{for } p' \in \left\{15 + \dfrac{3N_{ports}^{CSI}}{N_1^{Config}}, \ldots, 15 + N_{ports}^{CSI} - 1\right\} \text{ and } i \geq N_{res}^{CSI}/2 \end{cases}$$

Mathematical expression 5

In this case, according to the port numbering of 1702, 1703, 1704, and 1705, it can be seen that the CSI-RS port numbers are successively increased in accordance with the indexes of the component CSI-RS configurations. Accordingly, in this case, it is possible to apply the port numbering method of Mathematical expression 2 as it is. This is possible because one component CSI-RS configuration wholly includes horizontal-direction antenna ports.

The second method is to configure 16-port CSI-RSs through component CSI-RS configurations of 1706 and 1707. In this case, the base station may extend to 1708, 1709, 1710, and 1711, transmit 32-port CSI-RSs, and perform port sharing. In this case, according to the port numbering of 1708, 1709, 1710, and 1711, it can be seen that the In this case, if i=0 is substituted for, it is possible to determine the antenna port number of 1708, and if i=1 is substituted for, it is possible to determine the antenna port number of 1709. Further, if i=2 is substituted for, it is possible to determine the antenna port number of 1710, and if i=3 is substituted for, it is possible to determine the antenna port number of 1711.

As another port numbering method for CSI-RS port sharing, there may be a method for supporting only Mathematical expression 2. In this case, in order to support continuous port numbering, the CSI-RS configuration should be limited to satisfy the following conditions.

1) The number of antenna ports $N_2^{Config}$ in the second direction (or horizontal direction) included in one component CSI-RS configuration (i.e., the number of horizontal-direction antenna ports in an antenna array shape having a smaller size for port sharing) is equal to the number of second-direction antenna ports $N_2$ of a base station antenna array (i.e., the number of horizontal-direction antenna ports in an antenna array shape having a larger size for port sharing).

2) If condition 1) is not satisfied and $N_2^{Config}$ is smaller than $N_2$, the number of first-direction (or vertical-direction) antenna ports $N_1$ included in one component CSI-RS configuration is $N_1=1$.

One of methods for this is to make engagement so as to mean $N_2^{Config}=N_2$. Table 3 below indicates values of $N_1$ and $N_2$ for signaling to release 13 terminals. This may be understood by terminals after release 14 as $N_1^{Config}$ and $N_2^{Config}$. According to the above condition 1), the base station may adjust $N_2$ values of release 13 terminals, that is, $N_2^{Config}$, in accordance with $N_2$ configuration for the terminal after release 14 for CDM-4 based CSI-RS port sharing. For example, if $N_2$ for the terminal after release 14 is $N_2=4$, the base station configures this as $N_1^{Config}=2$, $N_2^{Config}=4$. For example, in this case, the number of CSI-RS ports of the release 13 terminal for the port sharing is 16. Further, as another example, if $N_2$ for the terminal after release 14 is $N_2=2$, the base station configures this as $N_1^{Config}=2$, $N_2^{Config}=3$. For example, in this case, the number of CSI-RS ports of the release 13 terminal for the port sharing is 12. The above example indicates that the number of CSI-RS ports configured to the release 13 terminal may be determined in accordance with $N_2$ configured to terminals after release 14.

TABLE 3

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |

If a CSI-RS resource for terminals after release 14 includes component CSI_RS configurations having different port numbers, crosstalk may occur in port numbering according to the above-described embodiments. As an example, if the number of CSI-RS ports included in the $k^{th}$ component CSI-RS configuration is $N_k=8$, and the number of CSI-RS ports included in the first component CSI-RS configuration is $N_1=4$, the CSI-RS port numbering for the CSI-RS port sharing may not have a regular structure as expressed in the above-described mathematical expressions. In order to avoid this problem, if the respective component CSI-RS configurations include different numbers of CSI-RS ports, that is, $N_k \neq N_1$, engagement can be made so that $N_2$ for terminals of release 13 or heretofore, that is, $N_2^{Config}$, follows $N_2$ of the first component CSI-RS configuration (where, k=1) configured to terminals after release 14.

Here, it should be noted that the number of CSI-RS ports according to the CSI-RS RE pattern specified according to the component CSI-RS configuration may differ from the number of CSI-RS ports included in the actual component CSI-RS configuration to be transmitted. For example, the RE pattern of the first CSI-RS configuration is determined by 8-port CSI-RS configuration, and the CSI-RS is transmitted using the 8 CSI-RS ports according to the RE pattern. In contrast, the RE pattern of the second CSI-RS configuration is determined by 8-port CSI-RS configuration, and the CSI-RS can be transmitted using only 2 or 4 CSI-RS ports. This is to support the CSI-RS port sharing with a smaller number of CSI-RSs and to constantly maintain the CDM pattern for a larger number of CSI-RSs at the same time.

In the above-described embodiments, it is mainly assumed that the base station has 32 antenna ports. However, a similar method, such as changing of the port number of a reference CSI-RS configuration or aggregation of the reference CSI-RS configuration including the different number of ports can also be adopted. Further, in the above-described embodiments, for convenience in explanation, terms "horizontal direction" and "vertical direction" have been used. However, it is apparent that they are generalized to be understood as the first direction and the second direction.

Figure 18:
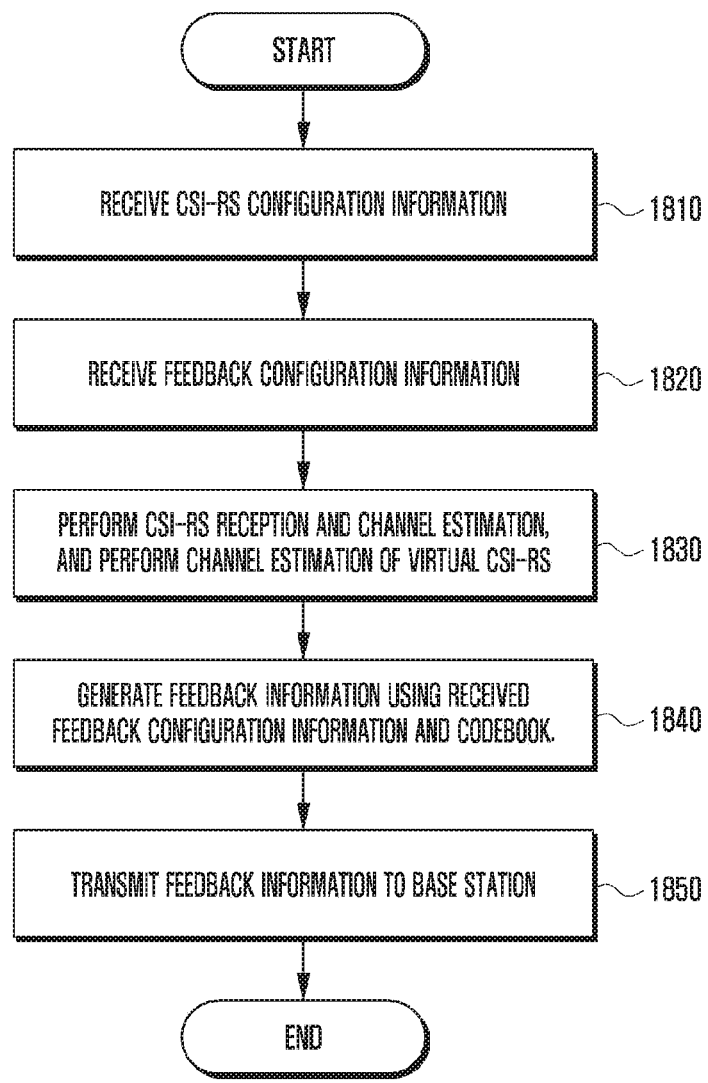
FIG. 18 is a flowchart illustrating an order of operations of a terminal according to an embodiment of the present disclosure.

FIG. 18 is a flowchart illustrating an order of operations of a terminal according to an embodiment of the present disclosure.

Referring to FIG. 18, at operation 1810, a terminal receives configuration information for CSI-RS configuration. The configuration information may include CSI-RS configuration information according to any one of the above-described embodiments. Further, the terminal may confirm at least one of the number of CSI-RS ports, transmission timing of CSI-RSs and resource locations, and transmission power information based on the received configuration information.

Thereafter, at operation 1820, the terminal receives feedback configuration information based on at least one CSI-RS. If the CSI-RS is received, the terminal, at operation 1830, estimates a channel between a transmission antenna of a base station and a reception antenna of the terminal using the received CSI-RS. Then, at operation 1840, the terminal generates RI, PMI and/or CQI that correspond to feedback information using the received feedback configuration and predefined codebook based on the estimated channel. In this case, the estimated channel may include a virtual channel that is added based on the CSI-RS configuration information.

Thereafter, at operation 1850, the terminal transmits the feedback information to the base station in the certain feedback timing in accordance with the feedback configuration of the base station.

Figure 19:
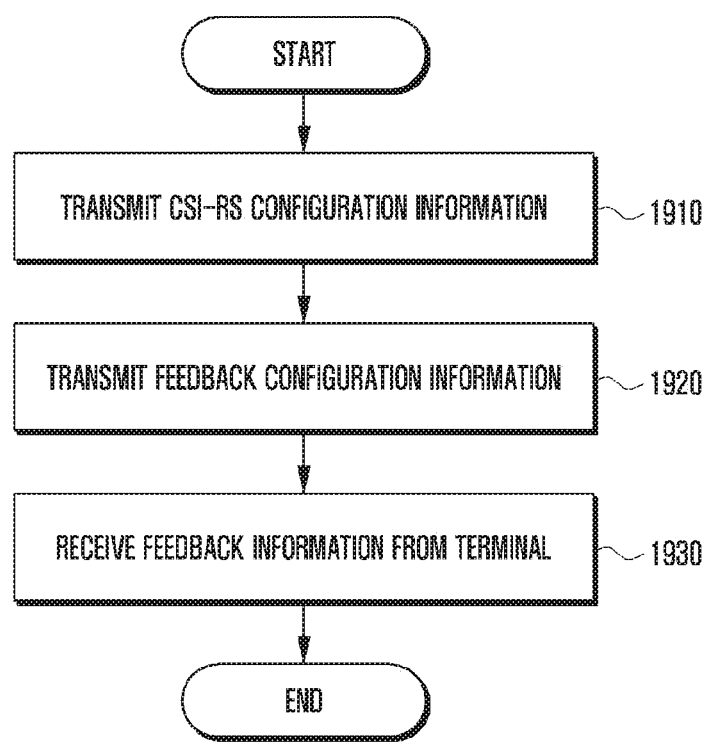
FIG. 19 is a flowchart illustrating an order of operations of a base station according to an embodiment of the present disclosure.

FIG. 19 is a flowchart illustrating an order of operations of a base station according to an embodiment of the present disclosure.

Referring to FIG. 19, a base station determines CSI-RS transmission configuration according to at least one of the above-described embodiments, generates CSI-RS configuration information, and the transmit CSI-RS configuration information for measuring a channel to a terminal at operation 1910. The configuration information may include at least one of the number of CSI-RS ports, transmission timing of CSI-RSs and resource locations, and transmission power information.

Thereafter, at operation 1920, the base station transmits to the terminal feedback configuration information based on at least one CSI-RS. Thereafter, the base station transmits to the terminal CSI-RSs configured according to the CSI-RS configuration information. The terminal estimates a channel for each antenna port, and estimates additional channel for a virtual resource based on this. The terminal generates and transmits to the base station PMI, RI and/or CQI that correspond to the feedback information at operation 1930. Accordingly, the base station receives the feedback information from the terminal in a certain timing, and uses the feedback information in determining the channel state between the terminal and the base station.

Figure 20:
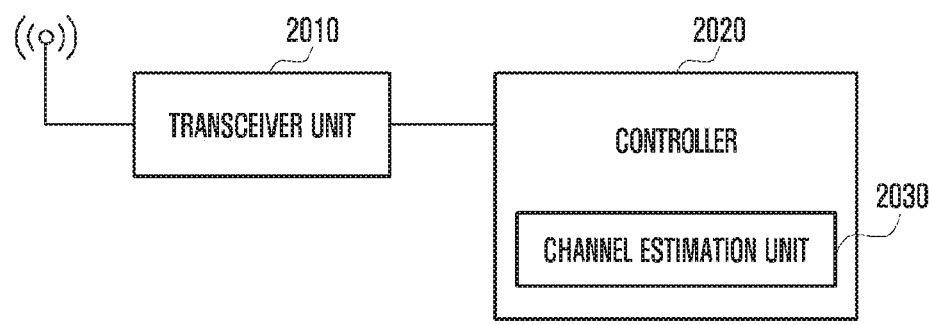
FIG. 20 is a block diagram illustrating an internal structure of a terminal according to an embodiment of the present disclosure.

FIG. 20 is a block diagram illustrating an internal structure of a terminal according to an embodiment of the present disclosure.

Referring to FIG. 20, a terminal includes a transceiver unit 2010 and a controller 2020. The transceiver unit 201 transmits and receives data from an outside (e.g., base station). Here, the transceiver unit 2010 may transmit feedback information to a base station under the control of the controller 2020. The controller 2020 controls states and operations of all constituent elements constituting the terminal. Specifically, the controller 2020 generates the feedback information according to information allocated from the base station. Further, the controller 2020 controls the transceiver unit 2010 to feed the generated channel information back to the base station according to timing information allocated from the base station. For this, the controller 2020 may include a channel estimation unit 2030. The channel estimation unit 2030 determines the necessary feedback information through the CSI-RSs and feedback allocation information received from the base station, and estimates a channel using the received CSI-RSs based on the feedback information.

FIG. 20 illustrates that the terminal includes the transceiver unit 2010 and the controller 2020. However, the configuration of the terminal is not limited thereto, but may further include various configurations according to the function performed in the terminal. For example, the terminal may further include a display unit displaying the current state of the terminal, an input unit receiving an input of a signal for function performing from a user, and a storage unit storing therein data generated in the terminal.

Further, although it is illustrated that the channel estimation unit 2030 is included in the controller 2020, but is not limited thereto. The controller 2020 may control the transceiver unit 2010 to receive from the base station configuration information for at least one reference signal resource. Further, the controller 2020 may control the transceiver unit 2010 to measure at least one reference signal, and to receive from the base station feedback configuration information for generating the feedback information according to the result of the measurement.

Further, the controller 2020 may measure at least one reference signal received through the transceiver unit 2010, and may generate the feedback information according to the feedback configuration information. Further, the controller 2020 may control the transceiver unit 2010 to transmit the generated feedback information to the terminal in a feedback timing according to the feedback configuration information.

Further, the controller 2020 may receive CSI-RSs from the base station, generate feedback information based on the received CSI-RSs, and transmit the generated feedback information to the base station. In this case, the controller 2020 may select a precoding matrix with reference to the relationship between the antenna port groups of the base and the terminal itself.

Further, the controller 2020 may receive the CSI-RSs from the base station, generate feedback information based on the received CSI-RSs, and transmit the generated feedback information to the base station. In this case, the controller 2020 may select a precoding matrix with reference to the relationship between the antenna port groups of the base and the terminal itself. Further, the controller 2020 may receive feedback configuration information from the base station, receive the CSI-RSs from the base station, and transmit the generated feedback information to the base station. Further, the controller 2020 may receive the feedback configuration information corresponding to the respective antenna port groups and additional feedback configuration information based on the relationship between the antenna port groups.

Figure 21:
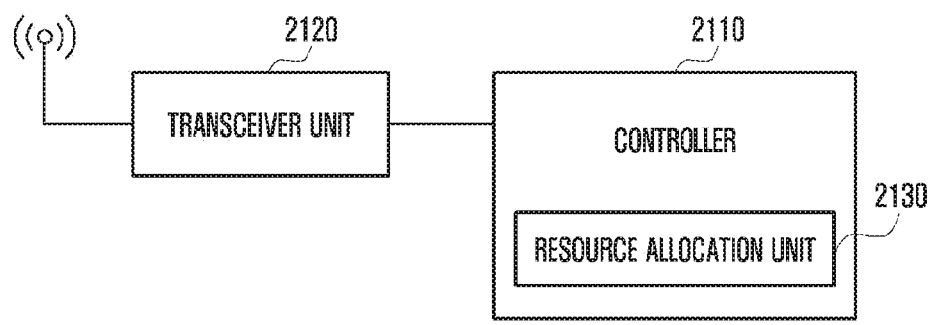
FIG. 21 is a block diagram illustrating an internal structure of a base station according to an embodiment of the present disclosure.

FIG. 21 is a block diagram illustrating an internal structure of a base station according to an embodiment of the present disclosure.

Referring to FIG. 21, a base station includes a controller 2110 and a transceiver unit 2120.

The controller 2110 controls states and operations of all constituent elements constituting the base station. Specifically, the controller 2110 allocates to a terminal CSI-RS resources for channel estimation of the terminal, and allocates feedback resources and feedback timing to the terminal.

For this, the controller 2110 may further include a resource allocation unit 2130. Further, the controller 2110 allocates feedback configuration and feedback timing so as to prevent collision of feedbacks from several terminals, and receives and analyses the feedback information configured in the corresponding timing. The transceiver unit 2120 transmits and receives data, a reference signal, and feedback information from the terminal. Here, the transceiver unit 2120 transmits the CSI-RSs to the terminal through the allocated resources under the control of the controller 2110, and receive a feedback of channel information from the terminal. It is illustrated that the resource allocation unit 2130 is included in the controller 2110, but is not limited thereto.

The controller 2110 may control the transceiver unit 2120 to transmit configuration information for at least one reference signal to the terminal, or may generate the at least one reference signal. Further, the controller 2110 may control the transceiver unit 2120 to transmit the feedback configuration information for generating the feedback information according to the measurement result to the terminal. Further, the controller 2110 may control the transceiver unit 2120 to transmit the at least one reference signal to the terminal and to receive the feedback information that is transmitted from the terminal in the feedback timing according to the feedback configuration information.

Further, the controller 2110 may transmit the feedback configuration information to the terminal, transmit the CSI-RSs to the terminal, and receive the generated feedback information from the terminal based on the feedback configuration information and the CSI-RS. In this case, the controller 2110 may transmit the feedback configuration information corresponding to the antenna port groups of the base station and additional feedback configuration information based on the relationship between the antenna port groups. Further, the controller 2110 may transmit beamformed CSI-RSs to the terminal based on the feedback information, and may receive the feedback information generated based on the CSI-RSs from the terminal.

According to the embodiments of the present disclosure as described above, the base station having a large number of transmission antennas of a 2D antenna array structure can prevent excessive feedback resource allocation for transmitting CSI-RSs and increase of channel estimation complexity of a terminal, and the terminal can effectively measure channels of a large number of transmission antennas and can report to the base station feedback information configured through the measurement.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a channel state information reference signal (CSI-RS) in a communication system, the method comprising:

transmitting CSI-RS configuration information including first configuration information on a first CSI-RS subgroup and second configuration information on a second CSI-RS subgroup to a terminal, the first CSI-RS subgroup being associated with first plural CSI-RS antenna ports and the second CSI-RS subgroup being associated with second plural CSI-RS antenna ports;

transmitting CSI-RSs based on the CSI-RS configuration information to the terminal; and receiving feedback information obtained based on the CSI-RSs from the terminal, wherein resources for the first CSI-RS subgroup and resources for the second CSI-RS subgroup is time division multiplexed or frequency division multiplexed.

2. The method of claim 1, wherein the resources for the first CSI-RS subgroup are allocated in each odd resource blocks (RBs) and the resources for the second CSI-RS subgroup are allocated in each even RBs, and wherein locations of time-frequency resources of the first CSI-RS subgroup and the second CSI-RS subgroup are same in each RBs.

3. The method of claim 1, wherein the resources for the first CSI-RS subgroup are allocated in each odd subframes and the resources for the second CSI-RS subgroup are allocated in each even subframes, and wherein locations of time-frequency resources of the first CSI-RS subgroup and the second CSI-RS subgroup are same in each subframes.

4. The method of claim 1, wherein the first configuration information includes configuration on a first CSI-RS resource which includes a first CSI configuration associated with the first plural CSI-RS antenna ports and time comb information or frequency comb information for the first CSI-RS resource, and wherein the second configuration information includes configuration on a second CSI-RS resource which includes a second CSI configuration associated with the second plural CSI-RS antenna ports and time comb information or frequency comb information for the second CSI-RS resource.

5. The method of claim 1, wherein the first configuration information includes a first CSI-RS configuration associated with the first plural CSI-RS antenna ports and time comb information or frequency comb information for the first CSI-RS configuration, and wherein the second configuration information includes a second CSI-RS configuration associated with the second plural CSI-RS antenna ports and time comb information or frequency comb information for the second CSI-RS configuration.

6. A method for receiving a channel state information reference signal (CSI-RS) in a wireless communication system, the method comprising:

receiving CSI-RS configuration information including first configuration information on a first CSI-RS subgroup and second configuration information on a second CSI-RS subgroup from a base station, the first CSI-RS subgroup being associated with first plural CSI-RS antenna ports and the second CSI-RS subgroup being associated with second plural CSI-RS antenna ports;

receiving CSI-RSs based on the CSI-RS configuration information from the base station; and transmitting feedback information obtained based on the CSI-RSs to the base station, wherein resources for the first CSI-RS subgroup and resources for the second CSI-RS subgroup is time division multiplexed or frequency division multiplexed.

7. The method of claim 6, wherein the resources for the first CSI-RS subgroup are allocated in each odd resource blocks (RBs) and the resources for the second CSI-RS subgroup are allocated in each even RBs, and wherein locations of time-frequency resources of the first CSI-RS subgroup and the second CSI-RS subgroup are same in each RBs.

8. The method of claim 6, wherein the resources for the first CSI-RS subgroup are allocated in each odd subframes and the resources for the second CSI-RS subgroup are allocated in each even subframes, and wherein locations of time-frequency resources of the first CSI-RS subgroup and the second CSI-RS subgroup are same in each subframes.

9. The method of claim 6, wherein the first configuration information includes configuration on a first CSI-RS resource which includes a first CSI configuration associated with the first plural CSI-RS antenna ports and time comb information or frequency comb information for the first CSI-RS resource, and wherein the second configuration information includes configuration on a second CSI-RS resource which includes a second CSI configuration associated with the second plural CSI-RS antenna ports and time comb information or frequency comb information for the second CSI-RS resource.

10. The method of claim 6, wherein the first configuration information includes a first CSI-RS configuration associated with the first plural CSI-RS antenna ports and time comb information or frequency comb information for the first CSI-RS configuration, and wherein the second configuration information includes a second CSI-RS configuration associated with the second plural CSI-RS antenna ports and time comb information or frequency comb information for the second CSI-RS configuration.

11. A base station for transmitting a channel state information reference signal (CSI-RS) in a wireless communication system, the base station comprising:

a transceiver; and a controller coupled with the transceiver and configured to:

transmit CSI-RS configuration information including first configuration information on a first CSI-RS subgroup and second configuration information on a second CSI-RS subgroup to a terminal, the first CSI-RS subgroup being associated with first plural CSI-RS antenna ports and the second CSI-RS subgroup being associated with second plural CSI-RS antenna ports, transmit CSI-RSs based on the CSI-RS configuration information to the terminal, and receive feedback information obtained based on the CSI-RSs from the terminal, wherein resources for the first CSI-RS subgroup and resources for the second CSI-RS subgroup is time division multiplexed or frequency division multiplexed.

12. The base station of claim 11, wherein the resources for the first CSI-RS subgroup are allocated in each odd resource blocks (RBs) and the resources for the second CSI-RS subgroup are allocated in each even RBs, and wherein locations of time-frequency resources of the first CSI-RS subgroup and the second CSI-RS subgroup are same in each RBs.

13. The base station of claim 11, wherein the resources for the first CSI-RS subgroup are allocated in each odd subframes and the resources for the second CSI-RS subgroup are allocated in each even subframes, and wherein locations of time-frequency resources of the first CSI-RS subgroup and the second CSI-RS subgroup are same in each subframes.

14. The base station of claim 11,
wherein the first configuration information includes configuration on a first CSI-RS resource which includes a first CSI configuration associated with the first plural CSI-RS antenna ports and time comb information or frequency comb information for the first CSI-RS resource, and
wherein the second configuration information includes configuration on a second CSI-RS resource which includes a second CSI configuration associated with the second plural CSI-RS antenna ports and time comb information or frequency comb information for the second CSI-RS resource.

15. The base station of claim 11,
wherein the first configuration information includes a first CSI-RS configuration associated with the first plural CSI-RS antenna ports and time comb information or frequency comb information for the first CSI-RS configuration, and
wherein the second configuration information includes a second CSI-RS configuration associated with the second plural CSI-RS antenna ports and time comb information or frequency comb information for the second CSI-RS configuration.

16. A terminal for receiving a channel state information reference signal (CSI-RS) in a wireless communication system, the terminal comprising:
a transceiver; and
a controller coupled with the transceiver and configured to:
receive CSI-RS configuration information including first configuration information on a first CSI-RS subgroup and second configuration information on a second CSI-RS subgroup from a base station, the first CSI-RS subgroup being associated with first plural CSI-RS antenna ports and the second CSI-RS subgroup being associated with second plural CSI-RS antenna ports,
receive CSI-RSs based on the CSI-RS configuration information from the base station, and
transmit feedback information obtained based on the CSI-RSs to the base station,
wherein resources for the first CSI-RS subgroup and resources for the second CSI-RS subgroup is time division multiplexed or frequency division multiplexed.

17. The method of claim 16,
wherein the resources for the first CSI-RS subgroup are allocated in each odd resource blocks (RBs) and the resources for the second CSI-RS subgroup are allocated in each even RBs, and
wherein locations of time-frequency resources of the first CSI-RS subgroup and the second CSI-RS subgroup are same in each RBs.

18. The terminal of claim 16,
wherein the resources for the first CSI-RS subgroup are allocated in each odd subframes and the resources for the second CSI-RS subgroup are allocated in each even subframes, and
wherein locations of time-frequency resources of the first CSI-RS subgroup and the second CSI-RS subgroup are same in each subframes.

19. The terminal of claim 16,
wherein the first configuration information includes configuration on a first CSI-RS resource which includes a first CSI configuration associated with the first plural CSI-RS antenna ports and time comb information or frequency comb information for the first CSI-RS resource, and
wherein the second configuration information includes configuration on a second CSI-RS resource which includes a second CSI configuration associated with the second plural CSI-RS antenna ports and time comb information or frequency comb information for the second CSI-RS resource.

20. The terminal of claim 16,
wherein the first configuration information includes a first CSI-RS configuration associated with the first plural CSI-RS antenna ports and time comb information or frequency comb information for the first CSI-RS configuration, and
wherein the second configuration information includes a second CSI-RS configuration associated with the second plural CSI-RS antenna ports and time comb information or frequency comb information for the second CSI-RS configuration.

\* \* \* \* \*